(12) United States Patent
Polzin et al.

(10) Patent No.: US 12,443,471 B2
(45) Date of Patent: Oct. 14, 2025

(54) SYSTEM AND METHOD FOR USER INTERACTIVE PIPELINING OF A COMPUTING APPLICATION

(71) Applicant: SambaNova Systems, Inc., Palo Alto, CA (US)

(72) Inventors: Joshua Polzin, Palo Alto, CA (US); Conrad Alexander Turlik, Palo Alto, CA (US); Arnav Goel, Palo Alto, CA (US); Qi Zheng, Palo Alto, CA (US); Maran Wilson, Palo Alto, CA (US); Neal Sanghvi, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 488 days.

(21) Appl. No.: 18/087,104

(22) Filed: Dec. 22, 2022

(65) Prior Publication Data
US 2023/0205613 A1 Jun. 29, 2023

Related U.S. Application Data

(60) Provisional application No. 63/294,773, filed on Dec. 29, 2021.

(51) Int. Cl.
*G06F 9/54* (2006.01)
*G06F 8/41* (2018.01)
*G06F 9/50* (2006.01)

(52) U.S. Cl.
CPC .............. *G06F 9/544* (2013.01); *G06F 8/453* (2013.01); *G06F 9/5016* (2013.01); *G06F 9/5038* (2013.01); *G06F 2209/507* (2013.01)

(58) Field of Classification Search
CPC ....................................................... G06F 9/544
See application file for complete search history.

(56) References Cited

U.S. PATENT DOCUMENTS 8,229,918 B2 7/2012 Branscome et al.
8,281,297 B2 10/2012 Dasu et al.
(Continued)

OTHER PUBLICATIONS

Lindholm et al., Nvidia Tesla: A Unified Graphics and Computing Architecture, IEEE, dated 2008, 17 pages.
(Continued)

*Primary Examiner* — Charlie Sun
(74) *Attorney, Agent, or Firm* — Flagship Patents; Sikander M. Khan; Bruce A. Young

(57) ABSTRACT

A method of pipelining execution stages of a pipelined application can comprise a Buffer Pipeline Manager (BPM) of a Buffer Pipelined Application computing System (BPAS) allocating pipeline buffers, configuring access to the pipeline buffers by stage processors of the system, transferring buffers from one stage processor to a successor stage processor, and transferring data from a buffer in one memory to a buffer in an alternative memory. The BPM can allocate the buffers based on execution parameters associated with the pipelined application and/or stage processors. The BPM can transfer data to a buffer in an alternative memory based on performance, capacity, and/or topological attributes of the memories and/or processors utilizing the memories. The BPM can perform operations of the method responsive to interfaces of a Pipeline Programming Interface (PPI). A BPAS can comprise hardware processors, physical memories, stage processors, an application execution program, the PPI, and the BPM.

30 Claims, 6 Drawing Sheets

(56) References Cited

U.S. PATENT DOCUMENTS

| | | | |
|---|---|---|---|
| 10,664,942 | B2 | 5/2020 | Paltashev et al. |
| 10,698,853 | B1 | 6/2020 | Grohoski et al. |
| 2019/0303297 | A1* | 10/2019 | Fleming, Jr. ........ G06F 13/1668 |
| 2021/0064975 | A1* | 3/2021 | Purandare .............. G06N 3/105 |
| 2022/0012077 | A1 | 1/2022 | Kumar et al. |

OTHER PUBLICATIONS

Prabhakar et al., "Plasticine: A Reconfigurable Architecture for Parallel Patterns," ISCA, Jun. 24-28, 2017, 14 pages.

Pu et al., Programming Heterogeneous Systems from an Image Processing DSL, ACM Trans. Archit. Code Optim. 14, 3, Article 26 (Aug. 2017), 25 pages. [URL: https://doi.org/10.1145/3107953].

* cited by examiner

SYSTEM AND METHOD FOR USER INTERACTIVE PIPELINING OF A COMPUTING APPLICATION

PRIORITY BENEFIT CLAIM

This application claims the benefit of U.S. Provisional Patent Application No. 63/294,773, titled "PIPELINING DATA IN RECONFIGURABLE ARCHITECTURE SYSTEMS," filed Dec. 29, 2021, which is incorporated by reference herein in its entirety.

CROSS-REFERENCE TO RELATED APPLICATION

This application is related to U.S. Nonprovisional patent Application titled "USER INTERACTIVE PIPELINING OF A COMPUTING APPLICATION USING A BUFFER PIPELINE PROGRAMMING INTERFACE", filed contemporaneously. The related application is hereby incorporated by reference for all purposes.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

U.S. Nonprovisional patent application Ser. No. 16/239,252, filed Jan. 3, 2019, entitled, "VIRTUALIZATION OF A RECONFIGURABLE DATA PROCESSOR,"; and U.S. Nonprovisional patent application Ser. No. 16/922,975, filed Jul. 7, 2020, entitled, "RUNTIME VIRTUALIZATION OF RECONFIGURABLE DATA FLOW RESOURCES,".

FIELD OF THE TECHNOLOGY

The technology disclosed relates to computing systems for executing pipelined and/or dataflow computing applications. In particular, the technology disclosed relates to executing pipelined computing applications (e.g., dataflow computing applications) in a computing the system. The computing system can comprise or utilize reconfigurable processors, such as coarse-grain reconfigurable architectures (CGRA) processors.

BRIEF DESCRIPTION OF THE DRAWINGS

The drawings included in the present disclosure are incorporated into, and form part of, the specification. They illustrate implementations of the present disclosure (hereinafter, "the disclosure) and, along with the description, serve to explain the principles of the disclosure. The drawings are intended to be only illustrative of certain implementations and are not intended to limit the disclosure.

DETAILED DESCRIPTION

Figure 1:
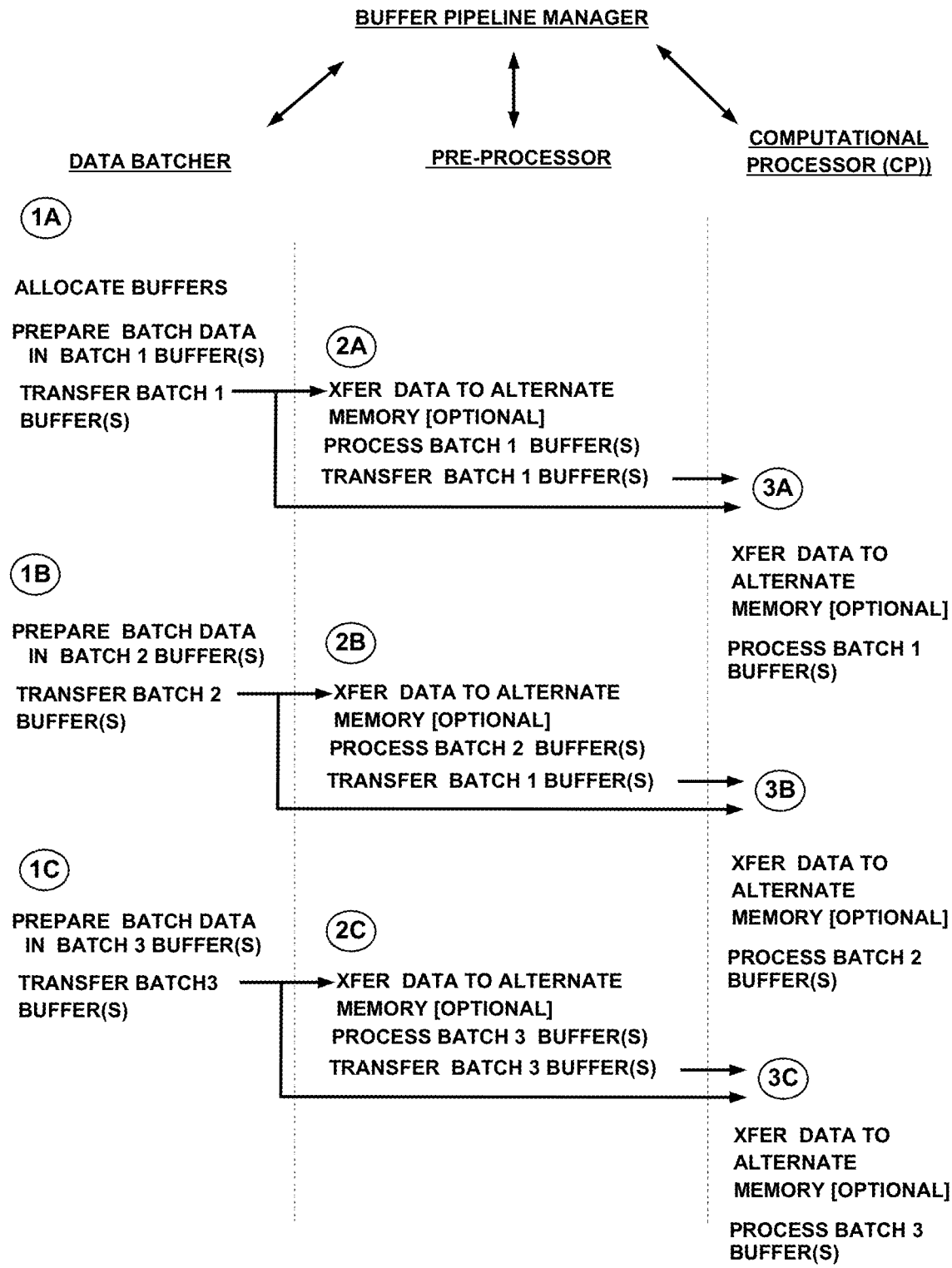
FIG. 1 illustrates pipelining data batching, pre-processing, and computational processing of application data in a computing system, according to aspects of the disclosure.

The present disclosure (hereinafter, "the disclosure") relates to computing systems for executing computing applications that can be processed in a pipeline of processing stages. Aspects of the disclosure relate to transferring application data and/or results of computations among multiple memories and compute units of a computing system using pipeline buffers among execution stages of the pipelined application.

Aspects of the disclosure can also particularly apply to processors of data parallel (DP) computing systems, such as Central Processing Unit (CPUs), Graphics Processing Units (GPUs), Field Programmable Gate Arrays (FPGAs), and Digital Signal Processors (DSPs). Certain aspects of the disclosure relate to performing tensor and/or matrix computations in computing systems utilizing reconfigurable processor architectures, such as computing systems utilizing Coarse-Grained Reconfigurable Architectures (CGRAs), and/or reconfigurable Application Specific Integrated Circuits (ASICs) or Application Specific Instruction-set Processors (ASIP).

Embodiments of the disclosure (hereinafter, "implementations") that are not mutually exclusive are taught to be combinable. One or more features of an implementation can be combined with other implementations. The disclosure in some instances repeats references to these options. However, omission from some implementations of recitations that repeat these options should not be taken as limiting the combinations taught in the preceding sections—these recitations are hereby incorporated forward by reference into each of the following implementations.

Particular expressions of the disclosure will be understood to have the following operative meanings:

The phrases "at least one"; "one or more"; and "and/or" are to be understood as open-ended expressions that operate both conjunctively and disjunctively. For example, each of the expressions "at least one of A, B, and C", "at least one of A, B, or C", "one or more of A, B, and C", "one or more of A, B, or C", and "one or more of A, B, and/or C" means A alone, B alone, C alone, A and B together, A and C together, B and C together, or A, B, and C together.

The term "a" or "an" entity refers to one or more of that entity. As such, the terms "a"/"an", "one or more", and "at least one" can be used interchangeably herein.

The terms "comprising", "including", and "having" can be used interchangeably herein.

As used herein, "incorporated subject matter" refers, collectively, to subject matter disclosed, and/or otherwise encompassed, among the disclosures incorporated herein by reference. For purposes of illustrating the disclosure, but not intended to limit implementations, various terms of the disclosure are drawn from the incorporated subject matter. As used herein, unless expressly stated otherwise, such terms as may be found in the incorporated subject matter have the same meanings, herein, as their meanings in their respective incorporated disclosures.

Aspects of the disclosure can be appreciated through a discussion of example implementations and/or applications of methods and/or systems. However, such examples are for purposes of illustrating the disclosure. It should be understood that the intention is not to limit the disclosure to the example implementations described herein, but to encompass all modifications, equivalents, and alternatives falling within the spirit and scope of the disclosure. Thus, the disclosure is not intended to be limited to the implementations shown but is to be accorded the widest scope consistent with the principles and features disclosed herein. Various modifications to the disclosed examples will be readily appreciated by those of ordinary skill in the art, and the general principles defined herein may be applied to alternative implementations of the disclosure (hereinafter, "implementations") without departing from the spirit and scope of the disclosure.

Turning now to more particular aspects of the disclosure, some computing applications comprise computations that can be executed concurrently, in parallel among a plurality of computational elements, and/or by a pipeline of computational elements (processors and/or programs executing on processors, of a dataflow computing system). As the application data and computational results "flow" through successive processing elements of a dataflow computing system, such pipelined dataflow applications can be referred to also as "dataflow" application. Examples of such dataflow applications include machine learning (ML) and deep machine learning (DML) methods of Artificial Intelligence (AI) applications; image processing; stream processing (e.g., processing of streaming video and/or audio data); natural language processing (NLP); and/or recommendation engines.

Dataflow computing systems can comprise reconfigurable processing elements (reconfigurable processors, or "RPs") particularly designed and/or configured to efficiently perform dataflow computing applications. Reconfigurable processors, such as field programmable gate arrays FPGAs and/or CGRA-based processors, can be configured to implement a variety of computational and/or data transfer functions more efficiently or faster than might be achieved using a general-purpose processor executing a computer program. Prabhakar, et al., "Plasticine: A Reconfigurable Architecture for Parallel Patterns," ISCA '17, Jun. 24-28, 2017, Toronto, ON, Canada, (hereinafter, "Prabhakar") describes example CGRAs and, systems utilizing such CGRAs, that can be particularly advantageous in dataflow computing system. Accordingly, aspects of the disclosure relate to methods and systems utilizing reconfigurable dataflow resources, such as resources of a CGRA. However, the disclosure is not necessarily limited to such applications and/or computing systems.

As used herein, the term "CGRA" refers interchangeably to a coarse grain reconfigurable architecture and a computing hardware implementation—such as an integrated circuit, chip, or module—based on, or incorporating, a coarse grain reconfigurable architecture. In various implementations, systems based on, and/or incorporating, CGRAs, such as the example of Prabhakar, can be particularly adaptable to, and increasingly efficient in, performing dataflow and/or data parallel application processing. Hardware resources of a CGRA (e.g., PCUs, PMUs, tiles, networks, and/or network interfaces) can comprise one or more Integrated Circuits (ICs). As used herein, the term "chip" refers to an IC (or, combination of ICs) that can embody elements of a CGRA. A chip can typically be packaged in a chip module (e.g., a single chip module, "SCM" or, alternatively, a multi-chip module, "MCM").

As used herein, the term "reconfigurable dataflow system (RDS)" refers to a computing system that is based on, and/or can utilize, reconfigurable dataflow resources, such as resources of CGRAs, to perform operations of dataflow applications. Owing to reconfigurability, reconfigurable dataflow systems can perform these operations more efficiently than systems comprising fixed or non-reconfigurable resources. As also used herein, the term "application" refers to any computing application (e.g., software program), and/or computing system, that utilizes an RDS, to perform algorithms and/or computations of the application. An application can execute, for example, on a processor included in, or coupled to, an RDS.

U.S. Nonprovisional patent application Ser. No. 16/239,252, "VIRTUALIZATION OF A RECONFIGURABLE DATA PROCESSOR", to Grohoski, et al, (hereinafter, "Grohoski"), and U.S. Nonprovisional patent application Ser. No. 16/922,975, "RUNTIME VIRTUALIZATION OF RECONFIGURABLE DATA FLOW RESOURCES", to Kumar, et al, (hereinafter, "Kumar"), both incorporated herein by reference, illustrate example implementations of a reconfigurable dataflow architecture and reconfigurable dataflow systems.

Kumar illustrates a dataflow system (e.g., an RDS) comprising user applications, programming libraries (e.g., deep learning frameworks), a software development kit, computation graphs associated with user applications, compilers, execution files that can specify operations of a user application to perform using resources (reconfigurable data flow resources) of the dataflow system, and host and runtime processors. User applications can comprise data parallel and/or dataflow applications. As illustrated by the examples of Kumar an RDS can comprise a plurality of physical racks each comprising one or more compute nodes (hereinafter, for brevity, "nodes").

In the examples of Kumar a host and runtime processors can, for example, facilitate compiling a dataflow application, determining particular RDS resources to execute the application, and managing execution of the RDS resources in performing operations of the application. In the examples of Kumar a node can comprise a host processor, a runtime processor, and reconfigurable processors ("RPs"), and a runtime processor can include kernel drivers and/or a user space library (e.g., a library of programs a user can include, or can invoke, in a dataflow application and that can execute in a user space of a runtime processor).

In implementations, an RP can comprise reconfigurable processing elements with reconfigurable interconnections. In the examples of Grohoski and Kumar, reconfigurable processing elements of RPs can comprise one or more arrays ("tiles") of configurable processors (pattern compute units, "PCUs") and/or memory units (pattern memory units, "PMUs"). In the examples of Grohoski and Kumar, an RP can comprise a set of tiles and/or subarrays of a tile.

As illustrated by Kumar and Grohoski, a reconfigurable data-flow unit (RDU) of a dataflow system can comprise a dynamically reconfigurable hardware resource of the system that includes processing elements (e.g., RPs) to perform operations of dataflow applications. RDUs of a dataflow system can comprise (e.g., be based upon), for example, a CGRA. An RDU can comprise a set of processing elements (e.g., RPs), I/O interfaces to communicate among processors of differing RDUs, and, optionally, a memory. In the examples of Kumar and Grohoski an RDU can, comprise other than simply computational elements (e.g., processors, such as PCUs) and/or memories (e.g., PMUs), such as clock circuits, control circuits, switches and/or switching circuits, interconnection interface circuits (e.g., processor, memory, I/O bus, and/or network interface circuits, etc. Kumar also illustrates that an RDU can include virtualization logic and/or, RP configuration logic.

For purposes of illustrating the disclosure, but not intended to limit implementations, the disclosure frequently refers to the example of an RDU comprising RPs of Kumar to illustrate a reconfigurable processing element for executing operations (e.g., computations and/or data transfer) of dataflow applications, such as matrix and tensor computations of dataflow applications. However, a processing element of a dataflow computing system can comprise alternative forms of hardware processors, or combination of hardware processors, memories, and/or interconnection to perform operations of dataflow applications. Dataflow processing elements can comprise, for example, central processing units (CPUs); accelerator-class processors; matrix processing units (MCUs), intelligence processing units (IPUs), graphics processing units (GPUs); and/or, field programmable gate arrays (FPGAs) configured to perform particular dataflow application computations.

Turning now to more particular aspects of the disclosure, certain types of computing applications can lend themselves to organization as distinct computational ("execution") stages, and the stages can be executed by a computing system as a pipeline of execution stages that can be executed in parallel. As used herein, the term "Pipelined Application" refers to a computation application that can be executed as a pipeline of execution stages. Staged applications can include, for example, artificial intelligence applications (e.g., machine learning, facial and/or voice recognition, complex data analysis, etc.), video processing, audio processing, natural language processing, streams processing, and/or other unstructured data processing.

Correspondingly, as also used herein, the term "Pipelined Application System" (PAS) refers to a computing system designed to execute, or otherwise capable of executing, a pipeline of execution stages of a pipelined application. A PAS can distribute computations of various execution stages among multiple processing elements, such that each element can perform a portion of the application computations (computations of a particular execution stage, or portion of a particular execution stage) concurrently with the other elements. Along with concurrent processing of application computations by a plurality of processors, pipelining execution of application stages is a form of parallelization of a computing application. In implementations a PAS can comprise reconfigurable processing elements particularly designed and/or configured to efficiently perform computations of pipelined applications (e.g., RPs as in the examples of Kumar).

Pipelined applications can have dataflow characteristics and can advantageously execute on a PAS comprising reconfigurable processing elements. In a PAS such as the example RDS of Kumar, a host and/or runtime processor can, for example, facilitate compiling a pipelined application, determining particular RDS resources to execute the application, and managing execution of the RDS resources in performing operations and/or computations of the application. A pipelined application (or, stages thereof) can execute on a processor included in, or coupled to, the RDS, such as an RP of Grohoski and Kumar. Thus, an RDS can serve as an example of a PAS for purposes of illustrating the disclosure, and references to an RDS in the context of methods and/or structures of the disclosure are understood to refer to an RDS as an example implementation of a PAS of the disclosure.

However, this is intended to illustrate the disclosure and not intended to limit implementations to only a PAS conforming to a dataflow, or reconfigurable dataflow, architecture or structure. One of ordinary skill in the art will appreciate that a PAS can comprise computing systems other than those utilizing reconfigurable computing elements, computing systems other than systems conforming to dataflow computing architectures, and/or computing systems other than reconfigurable dataflow computing systems. Use of an RDS as an example PAS is, therefore, not to be construed as limiting implementations to a PAS comprising an RDS.

As used herein, the term "computational processor" (CP) refers to a processing element of a PAS configured to execute computational operations (e.g., computations and/or data transfer) of pipelined applications. In implementations, a CP can comprise reconfigurable processing elements, such as an RDU or RP of Kumar, for executing computational operations ("computational processing") of pipelined applications. However, one of ordinary skill in the art will appreciate that an RDU and/or a CP of a PAS can comprise any form of hardware processors, memories, or combination of hardware processors and memories, that can perform operations of pipelined applications. PAS CPs, and/or other processing elements of a PAS, can comprise, for example, central processing units (CPUs); accelerator-class processors; tensor processing units (TPUs), intelligence processing units (IPUs), graphics processing units (GPUs); RPs of an RDS (such as illustrated in Kumar); and/or, field programmable gate arrays (FPGAs).

Pipelined applications can involve processing very large volumes of application data, and a PAS can comprise configurations of numerous hardware resources, such as RDUs and/or RPs in the examples of Kumar. Thus, there is significant opportunity for system designers and companies to provide pipelined application processing, utilizing large numbers of high-performance processors (e.g., CPs), in cloud computing systems, and/or as cloud computing services. A PAS can be included in, and/or communicatively coupled to, a cloud computing system (hereinafter, a "cloud", for brevity).

A PAS can virtualize processing resources of a PAS (e.g., virtual RDUs and/or CPs) as components of a cloud computing system. Grohoski and Kumar illustrate virtualizing physical resources of an RDS, for example, and that such virtual resources can be accessible in, or through, a cloud. As illustrated by Grohoski and Kumar, a virtualized PAS can comprise virtual machines (VMs) and the virtual machines can comprise, for example, virtual processors (e.g., virtual host and/or runtime processors); virtual CPs (e.g., virtual tiles and/or PCUs of RPs), and/or virtual memories (e.g., memory of, or coupled to a host processor, runtime processors, or CP, and/or virtual PMUs). In a PAS, a virtualization manager (e.g., a "hypervisor" or an operating system kernel) can allocate and/or bind the virtual resources to the corresponding physical resources as part of initiating execution of an application utilizing the virtual resources.

In more particular aspects of the disclosure, an "application execution program" (AEP) can manage input of pipelined application data into a PAS for processing, and/or can manage execution (e.g., start, suspend, and/or terminate execution) of a pipelined application by a PAS. In implementations, an AEP can be a program (or, programs) separate from the application, such as an adjunct ("user") program designed to manage execution of a pipelined application. Alternatively, an AEP can be a component of the application itself, or components of an AEP can be components of the application itself.

A PAS can execute an application in execution stages. For example, a load stage can comprise an application execution stage for preparing application data for input to a PAS. A pre-process stage can comprise an application execution stage for pre-processing input application data, to prepare the data for computational processing by a CP or, by a particular CP or particular type of CP, of the PAS. A computation stage can comprise an application execution stage for performing computational processing of the application data and outputting results of computational computations. As used herein, the term "computational processing" refers to computations of a pipelined application performed by CPs of a PAS.

In implementations, particular "stage processors" can perform operations of corresponding application execution stages. For example, a load processor can comprise a stage processor to execute operations of a load stage, a pre-processor can execute operations of a pre-process stage, and a computational processor can execute operations of a computational stage. A stage processor can comprise software (e.g., programs), hardware (hardware processors and/or other hardware components of a PAS), or a combination of software and hardware for performing operations of a respective execution stage of an application. A pre-processor can process data output from a load processor (e.g., application data input to a PAS for processing) and a computational processor can process data output from a load processor and/or pre-processor.

In a PAS different stage processors can perform operations on application data in differing physical memories accessible to PAS hardware resources. A PAS can comprise, for example, a physical memory of a host processor (or, another computing system communicatively and/or operatively coupled to a PAS) that can execute an AEP, a physical memory of a runtime processor, and a physical memory of, or coupled to, a CP of the PAS. Hardware processors (e.g., a CPU of a host computer) executing a load processor can perform operations on application data in a physical memory of a host computer, or host computing system. Hardware processors executing a pre-processor (e.g., a CPU of a host or runtime computer, or an RDU) can perform operations on application data in a physical memory of a host computer, runtime processor, and/or RDU. Hardware processors of a computational processor can perform operations on application data in a physical memory of a CP. In some implementations, hardware processors utilized to execute various execution stages of an application can have access to some or all of the physical memories of the PAS.

Application data associated with a pipelined application (hereinafter, "application data") can comprise very large volumes of data, such as very large volumes of tensor data. During execution ("runtime") of an application on a PAS, an AEP can interact with the PAS (e.g., with a runtime processor of a PAS) to control execution of the application and/or input application data to the PAS. An AEP can execute, for example, on a host processor of a PAS, or on a computer or computing system communicatively coupled to a PAS. An AEP can comprise, for example, a user space program and can execute in a user space of a host computing system.

Given the large volume of application data commonly associated with pipelined applications, application data can be advantageously subdivided into "data batches" for processing by a PAS. As used herein, "data batch" will be understood to comprise any amount or organization of application data for processing by a PAS (e.g., host processors, runtime processors, and/or CPs). Thus, "data batch" refers, herein, to a portion of application data that can be input, as a subset of the application data (or, a subset of computational results of an execution stage), into a PAS for computational processing of the data. Data included in a data batch is referred to herein as "batch data", and can comprise any amount or portion of a data batch.

In implementations a load processor can comprise a "data batcher" that can prepare application data for input, and/or perform input of application data, as one or more data batches. For example, a data batcher can subdivide application data, such as particular tensors, into data batches (e.g. a batch of tensors or other data elements), and/or format application data within a data batch. A data batcher can load (input) a data batch into a memory of the PAS for processing that portion of the application data. Data batches (e.g., size, data types, and/or formats of data batches and/or elements thereof) can be based on the capacity of a PAS, and/or components of a PAS, to store and/or operate on the application data. Additionally, data batches lend themselves to parallel and/or pipeline processing of application computations by CPs of a PAS.

A data batcher can comprise, for example, a component of an AEP, a pipelined application compiler (hereinafter, for brevity, simply "compiler"), and/or runtime component of a PAS. A data batcher can comprise a program of an AEP, compiler, and/or runtime processor. A data batcher can execute, for example, on a processor of a PAS, such as a host processor, runtime processor, and/or a CP of a PAS (e.g., a CP of an RDU). For only purposes of illustrating the disclosure, but not intended to limit implementations, a data batcher can be considered to be a component of an AEP. However, it will be appreciated by one of ordinary skill in the art that a data batcher can be a component of computing systems, or components of computing systems, other than an AEP, such as the example implementations of a data batcher just described.

A data batcher can prepare and/or input data batches to a PAS in a batch memory of, or coupled to, the PAS. In implementations a batch memory can comprise any physical memory accessible to a processor on which a data batcher executes to prepare and/or input batch data to a PAS. A batch memory can comprise a virtual and/or a physical memory. Correspondingly, as used herein, "batch memory" refers to any memory (and/or, physical location of a memory) in which a data batch, or a portion thereof, is placed, or stored, for access by a data batcher to operate on, or store, batch data and/or to input batch data to application execution components of a PAS (e.g., host processors, runtime processors, and/or CPs).

A load stage of an application is not necessarily limited to inputting only input application data. In some implementations, a load stage can comprise receiving outputs of computational processing of application data, such as in application algorithms utilizing backpropagation of computational results (e.g., a gradient computation of a gradient descent algorithm), or in preparing results of computational processing for additional execution stages of the application. Thus, a data batcher can generate data batches from such results data in addition to, or alternative to, generating data batches from input application data.

As previously described a pre-processor of a BPAS can pre-process a data batch to prepare the data for computational processing. For example, a particular CP of the PAS, or a particular computation using the data, can require pre-processing batch data prior to computational processing of the data. Pre-processing can comprise, for example, converting a data type of batch data, such as from a 32-bit floating point number to a 16-bit floating point number, or conversion of a format, data type, organization of data, and/or values of the data, as prepared by a data batcher (or, as output from a CP computation of the application) to an alternative form, such as an alternative format, data type, organization, and/or values, that can be required, or is more suitable for, processing by particular processing elements of a PAS, such as particular RDUs, and/or CPs of a PAS.

In another example, pre-processing can comprise or transforming the order (of rows and/or/columns in a matrix, such as an order of rows and/or columns in a memory containing a tensor matrix. These are, however, only two examples of pre-processing transformations of data (e.g., batch data) input to an execution stage of an application. One of ordinary skill in the art will appreciate that particular computational processing of input data and/or processors operating on input data can comprise many varieties of pre-processing the input data.

A pre-process stage of application execution can comprise pre-processing some or all of input batch data (or, computational results data as input batch data) to perform various transformations of the data. In implementations a pre-processor component of a PAS can comprise a stage processor to execute operations of a pre-process stage on input batch data input. A pre-processor can comprise, for example, a program, or function, executable by one or more CPs of a PAS. A pre-processor can comprise, for example, a program of a runtime library of a PAS, and/or a program executing on a runtime processor of a PAS. A pre-processor can operate on batch data in a pre-process memory. A pre-process memory can comprise any memory accessible to a processor on which a pre-processor executes to pre-process batch data. A pre-process memory can comprise a virtual and/or a physical memory. Correspondingly, as used herein, the term "pre-process memory" refers to any memory (or, physical location of a memory) in which a data batch, or a portion thereof, is placed, or stored, for access by a pre-processor of a PAS to perform pre-processing of the data and/or output results of pre-processing batch data.

In a computational stage, a CP can perform computational processing of input batch data and/or pre-processed data, according to the particular functions or computations of the application. For example, computational processing can comprise a CP (or, set of CPs) performing matrix computations, on input and/or pre-processed data batches. CPs of a PAS, for example, can perform computational processing on batch data comprising an output of particular application computations, such as outputs of GeMM, matrix transpose, and/or gradient descent computations.

A PAS can advantageously configure particular RDUs, and/or particular CPs of RDUs, to adapt the configuration of the RDUs/CPs to concurrently execute operations of pipelined applications. CPs can operate on batch data in memories included in and/or operationally coupled to the CPs. For example, a "device memory" of a CP can comprise a memory included in an RDU or CP of an RDU, such as a DRAM or SRAM an RDU, a PMU of a tile, and/or a scratchpad memory of a PCU, or PMU of a tile. A CP can operate on batch data in such device memories and the device memories can be performance-advantaged for CP computational processing of batch data.

CPs of a PAS can perform computational processing on batch data in a computational memory. In implementations, a computational memory can comprise any memory accessible to an RDU, and/or CPs, of a PAS. As used herein the term "computational memory" refers to refers to any memory (or, physical location of a memory) in which a data batch, or portion thereof, is placed, or stored, for access by a CP to perform computational processing, and/or output results of computational processing, of batch data.

In a PAS, a batch memory, pre-process memory, and/or computational memory can comprise the same physical memories or, alternatively, can comprise differing physical memories. In a case that one or more of the user, pre-process, and computational physical memories are the same, the memory can, however, have access limited to only one entity at a time. For example, a memory can be such that only one of a data batcher, a pre-processor, and an RDU (or CPs thereof) of a PAS can access data in the memory at any one time. It can be the alternative case that a physical memory of a batch memory differs from a physical memory of a pre-process memory or a computational memory, and/or that a physical memory of a pre-process memory differs from a physical memory of a computational memory. For example, a batch memory can comprise a physical memory that can allow a data batcher to most efficiently process a data batch, while an alternative, pre-process physical memory can allow a pre-processor to most efficiently process a data batch. Similarly, a physical memory that can allow a CP to most efficiently process a data batch can be a physical memory different from that of a user and/or a pre-process memory. Processing batch data in differing memories can, consequently, require transferring batch data from one physical memory to another.

Constraints such as serial access to a memory by a data batcher, pre-processor, and CP, and transferring batch data among differing physical memories, can lead to a PAS performing stages of application execution serially, completing operations of one stage prior to initiating execution of a subsequent stage. For example, an AEP can load application data in a memory of a PAS and, upon loading a complete set of application data (e.g., a number of tensors, or tensor elements), the AEP can input the complete set of data, in that memory, to a pre-processor of CP. A pre-processor can pre-process the input data and, upon pre-processing all of the input data, can initiate computational processing of the data. While each processing stage is in progress, other processing stages can be idle, awaiting completion of an executing stage of the application. Such serial processing can produce longer processing latencies as the sum of the stage latencies (e.g., latency for a pipelined application to prepare/input data batches, latency for a pre-processor to pre-process data batches, and latency for a CP to operate on input/pre-processed data).

In implementations, a "buffer-pipelined" application system (BPAS) comprises a computing system that can efficiently pipeline execution stages utilizing pipeline buffers that can be included in various memories of the system, and that can enable an AEP to interact with components of the BPAS to improve overall performance of a pipelined application and improve utilization of BPAS (e.g., hardware) resources. A BPAS can comprise one or more application programming interfaces (APIs) that can enable an AEP and components of the BPAS to interactively pipeline execution stages among processors of an AEP and/or BPAS. In particular, a BPAS can comprise APIs and/or functions that can enable an AEP to determine and/or allocate a set of pipeline buffers among physical memories of the BPAS; to store application data and/or processed application data; load data batches into pipeline buffers; submit the buffers to the BPAS for processing; and/or to initiate stage processors, such as a pre-processor and/or CP, to process data in the buffer. Such APIs can comprise, for example, programming functions, shared memories/data structures, configuration and/or hardware attribute files, BPAS component (e.g., compiler) outputs, and/or command line interfaces.

Software components of a BPAS—such as software components of an AEP, runtime program, BPM, and/or stage processors—can execute in program threads of the BPAS. A program thread can comprise a thread of an operating system. A program thread (hereinafter, for brevity, simply "thread") can utilize synchronization primitives, such as thread locks, thread blocks, semaphores, and/or interrupts to suspend and/or resume processing pending an event, such as a pipeline buffer becoming available for processing.

A BPAS can include a buffer-pipeline manager (BPM) that can allocate regions of physical memories, and/or manage batch data among physical memories, to facilitate pipelining data batching, pre-processing, and/or computational processing of batch data. A BPM can interact with an AEP (e.g., a data batcher of an AEP), pre-processor, and/or computational processors of a BPAS to pipeline operations of pipelined application execution. A BPM can comprise, for example, programs executable on processors (e.g., host processors, runtime processors, and/or CPs) of a BPAS. A BPM can comprise a computer, or computing system, communicatively coupled to a host, runtime, and/or reconfigurable processor(s) of a BPAS and can include programs executable in such a computer or computing system. A BPM can comprise, for example, a component (e.g., a program) of a runtime kernel and can execute in a kernel space of a runtime processor operating system of a BPAS.

A BPM can allocate pipeline buffers (hereinafter, for brevity, "buffers") among physical memories of a BPAS to enable a data batcher to generate data batches and input batch data to PAS processing elements, a pre-processor to pre-process batch data, and a CP to computationally process batch data, concurrently (in parallel) rather than serially. A BPM can allocate buffers in particular physical memories, and/or particular regions of physical memories, to optimize placement of application data in physical memories accessible to particular hardware processors of a BPAS, and/or most efficient to for particular hardware processors to access application data and/or processing output data. A BPM can transfer, of batch data, pre-processor, computational data among physical memories while pipelining execution of application execution stages to maintain optimal placement of data processed in each stage among physical memories accessible to hardware processors executing the stages.

A BPM can allocate buffers in response to a request from a data batcher, and/or a request or directive of a runtime component of a BPAS (e.g., a runtime processor configuring and/or dispatching BPAS hardware resources to execute the application), to allocate the buffers. A BPM can allocate buffers in particular physical memories based, for example, on an output of a compiler (e.g., an execution file) and/or a runtime processor (e.g., a runtime configuration file of a BPAS identifying particular physical BPAS resources, and/or configurations of BPAS resources, to execute operations of an application, such as can be generated by a compiler and/or runtime component of a BPAS).

Hardware elements of a BPAS can access regions of a physical memory using a physical address (PA). Pipeline buffers can have associated physical addresses of physical memory regions to store data in the buffers. Pipeline buffers can additionally have virtual addresses (VAs) that stage processors, and/or hardware processors executing stage processors, can reference and access the buffers using the virtual addresses. A BPM can assign the virtual addresses, and/or can initialize and/or update address translation logic (ATL) of a BPAS to translate the virtual addresses to physical addresses. As used herein, "virtual address" (VA) refers to any form of a memory address translated by components of a BPAS to a physical address in a physical memory.

VAs of pipeline buffers can comprise VAs of data (e.g., batch data and/or data in pipeline buffers) and/or data structures (e.g., pipeline buffers) used, for example, by programs of an AEP, data batcher, compiler, and/or runtime component, and/or hardware processors to reference the buffers and data structures. In implementations, address translation logic (ATL) can perform such translations. ATL can include, for example, an address translation window (ATW) that can map one address space (e.g., a VA space, or portion thereof) to another address space (e.g., an address space of a physical memory), and/or can include address translation circuits to translate addresses of such mappings. An ATW can include pinned memory, such as a mapping from a VA space to a physical memory in which pages (or other defined portions) of the physical memory are "pinned" for use by processors executing stages of an application.

In virtualized implementations, an AEP can execute on a virtual machine (VM) and physical address spaces of the BPAS can be virtualized as a "real address" space, such that a VA of a pipeline buffer, as known to an AEP or other components of the VM, can translate to a real address (RA) of the VM real address space, and the RA can be translated to a PA of a physical memory of the BPAS (e.g., a host, RDU, and/or CP memory). In such a case, an ATW can comprise a translation of a buffer from a RA of a VM to a PA of a physical memory of the BPAS.

As used herein, the term "buffer" is used interchangeably to refer to a logical identity of a buffer (e.g., a virtual address, or an index of a buffer among a set of buffers), and the particular physical memory that contains data of the buffer. For example, "batch buffer" refers interchangeably, herein, to a logical identify of a batch buffer and to a physical memory that contains data of the batch buffer; "pre-process buffer" refers interchangeably, herein, to a logical identity of the pre-process buffer and to physical memory that contains data of the pre-process buffer; and, "computational buffer" refers interchangeably, herein, to a logical identity of the computational buffer and to a physical memory that contains data of the computational buffer.

In implementations a data batch can comprise a number of data elements (e.g., tensors of a pipelined application) and buffers can have a size corresponding to a size of a data element, or set of data elements, of the data batch. A set of data buffers can total an amount of data in a data batch, or can total a lesser amount. For example, a data batch can comprise 64 data elements and a BPM can allocate 64 buffers, such that a data batcher can load all of a batch of data into the set of buffers, or can allocate fewer buffers such that the data batcher can load only a subset of the data elements in the buffers at any one time. Additionally, in implementations, a pipeline buffer need not necessarily correspond to a size of a data element of a data batch. For example, a data element can comprise, say, a 64-byte tensor and a BPM can allocate (e.g., based on an RDU or CP of an RDU to perform computations on the tensor) two 32-byte buffers to store the tensor for processing by the BPAS.

An AEP, data batcher, compiler, and/or runtime component can request a BPM, or otherwise indicate to a BPM, to allocate buffers in a virtual memory and/or a particular physical memory. For example, an AEP, data batcher, compiler, and/or runtime component can request a BPM to allocate buffers in a particular host and/or RDU physical memory, such as a device memory and/or in a virtual memory corresponding to one or more of these physical memories. An AEP, data batcher, compiler, and/or runtime component can request or otherwise indicate to a BPM to allocate buffers of particular sizes, such as buffers corresponding to sizes of application data (e.g., tensors) and/or corresponding to a type of processing (batching, pre-processing, and/or a type of computational processing) of batch data. An API of the BPAS can enable an AEP and/or components of the BPAS to determine address parameters to establish ATWs, and/or configure ATL to translate buffer addresses using particular ATWs.

A BPM can allocate batch, pre-process, and/or computational memories, and/or buffers located within these memories, at runtime of a pipelined application. The BPM can allocate the physical memories, and/or buffers within them, based on processors (e.g., a host CPU, a runtime processor, and/or a CP) executing a data batcher, pre-processor, and/or application computations. The BPM can allocate buffers in particular physical memories of a BPAS based on attributes of the memories to provide to stage processors the memories most advantageous to a data batcher, pre-processor, and/or CP to access batch data, and/or to minimize transfer of batch data among memories. Memory attributes can comprise, for example, a size of a memory; a width of data or I/O buses of a memory; distance of a particular hardware processor to the memory (e.g., a number of hops through a switching network, or a physical length of a memory interface); performance attributes of a memory, such as a bandwidth and/or access latency of the memory; a particular means (e.g., a bus versus a network) of access to a memory, and/or accessibility of the memory by any means, by a particular hardware processor of the system.

A compiler output can direct data batches to be loaded, for pre-processing, and/or computational processing in buffers of particular memories or particular types of memories (e.g., based on the data composition of the data batches and/or particular CPs to process the data batches). A BPM can extract information from an output of a compiler (e.g., a BPAS execution file of a pipelined application) or an output of an AEP and/or runtime processor to determine a size of buffers and/or particular physical memories to locate the buffers.

A BPM can allocate the buffers in virtual address spaces and the physical address of a buffer can be the same for virtual addresses of the buffer as known to a data batcher, a pre-processor, and/or a CP. That is, each of a data batcher, a pre-processor, and/or a CP can know a different virtual address of a buffer, to perform their respective processing of batch data in the buffer, and the different virtual addresses can translate to the same physical memory address such that the respective processing operations can occur without transferring the batch data among different physical memories.

In some cases, however, as previously described a particular physical memory can be advantageous to each of a data batcher, pre-processor or CP processing batch data in that memory. Thus, it can be necessary to transfer data from a buffer in one physical memory to a buffer in a different physical memory, such as to transfer batch data, loaded by a data batcher into a buffer located in a host physical memory, to a buffer located in a physical memory of a runtime processor or RDU for pre-processing. Similarly, it can be necessary to transfer batch data loaded into a buffer located in a host physical memory to a buffer in an RDU device memory for processing by a CP. A BPM can interact with a data batcher, pre-processor, and CP (or, an RDU including a CP) to transfer batch data among buffers as the data batcher, pre-processor, and CP pipeline processing of a data batch.

A BPAS (or, a BPM of a BPS) can comprise a Pipeline Programming Interface (PPI) that can enable an AEP to interact with components of the BPAS, such as a BPM and/or PAS runtime component. A PPI can enable an AEP to determine and/or allocate buffers, to place batch data in particular buffers, and/or to pipeline data batcher processing, pre-processing, transfer of batch data among physical memories, and/or computational processing of batch data. A PPI can comprise for example, an AEP and/or pipelined application programming interface (API), command line interface (CLI), and/or messaging interface (MI, such as request/response messages).

An interface of a PPI can enable an AEP and/or runtime processor to determine attributes of pipeline buffers ("buffer attributes"). Buffer attributes can comprise, for example, numbers, sizes, and/or types of buffers required to execute an application, and/or stages of an application. Buffer attributes can comprise types of memories best suited for BPAS processor to process data in particular buffers. Via an interface of a PPI, program of an AEP and/or BPAS (e.g., a BPM or runtime program) can, for example, determine memories available to execute an application. A program of an AEP and/or BPAS can use an interface of a PPI to request allocation of pipeline buffers in particular memories (e.g., a host memory, a runtime memory, and/or a device memory), to place buffers, and/or batch data in buffers, in memories most suitable, and/or advantageous, for processing by a particular stage processor.

An interface of a PPI can enable an AEP and/or runtime processor of a BPAS, for example, to determine attributes of hardware resources ("resource attributes") of a BPAS. A PPI can enable a program of an AEP and/or BPAS (e.g., a BPM or stage processor of a BPAS) to initiate transfer of buffers from one stage processor to another, and/or transfer of batch data among buffers in different physical memories. A PPI can include an interface (or, parameters of an interface) that can enable an AEP to directly allocate, or otherwise assign, a region of physical memory of the BPAS to one or more pipeline buffers.

Turning now to the examples of the Drawings, FIG. 1 illustrates an example of pipelining batch data processing among pipeline buffers of a BPAS, such as an RDS. Using batch data stored in pipeline buffers, a BPAS can pipeline operations on data batches to process differing data batches in parallel (i.e., concurrently). For only purposes of illustrating the example of FIG. 1, but not intended to limit implementations, FIG. 1 illustrates an example of a BPM pipelining batch data processing among stage processors comprising a data batcher, pre-processor, and a computational processor (e.g., CPs of an RDU configured to execute computations of a pipelined application). One of ordinary skill in the art will appreciate that stage processors executing a pipelined application can comprise fewer or more than 3 stage processors as illustrated in the example of FIG. 1, and/or that stage processors can comprise stage processors other than a data batcher, pre-processor, and/or computational processor. One of ordinary skill in the art will further appreciate that pipeline buffers can comprise other than batch, pre-process, and/or computational buffers such as used to illustrate the example.

Also for purposes only of illustrating the example of FIG. 1, but not intended to limit implementations, a pre-processor, computational processor, host processor, runtime processor, and BPM can be considered components of a BPAS, such as a threads executing programs of these components on hardware processors of the BPAS. In illustrating the example of FIG. 1, but also not intended to limit implementations, the BPAS is considered to include a PPI (hereinafter, with reference to FIG. 1, "the PPI") such as previously described.

In stage 1A of FIG. 1 the data batcher allocates, or requests the BPAS to allocate, a set of pipeline buffers in one or more memories of the BPAS. The buffers can comprise batch, pre-process, and/or computational buffers, and the buffers can be pre-allocated or predetermined, such that allocating buffers in stage 1A can return a set of pre-allocated or pre-determined buffers. In stage 1A the data batcher prepares batch data in one or more available buffers—for purposes of the example of FIG. 1, a batch buffer—among the allocated buffers. A buffer can be considered available to the data batcher if, for example, the buffer is not storing other batch data input for processing (e.g., new batch data), not storing data output from pre-processing or computational pre-processing, or not storing data currently being processed by a pre-processor or computational processor. A BPM (and/or another component of a BPAS) can monitor (e.g., poll or receive an interrupt) status of batch buffers to indicate that a buffer is, or has become, available.

The data batcher can load application data elements of a data batch into the batch buffer(s). The data batcher can subsequently submit the batch buffer(s) to the BPM (e.g., via an interface of the PPI) for transfer to a stage processor (e.g., a pre-processor or CP) for processing. In operation 1A, the data batcher can load data in one batch buffer and submit that buffer for transfer to a pre-processor or CP of the BPAS or, alternatively, can load data into a set of batch buffers. A data batcher can organize a plurality of data batches as a group, and can load a group of data batches into a corresponding group of batch buffers. The data batcher can submit (e.g., via the PPI) individual buffers or, alternatively, can submit one or more groups of buffers, for transfer to a pre-processor or CP of the BPAS.

The BPM can receive, or determine availability of, batch buffers for processing (e.g., by a pre-processor and/or computational processor) via a status of the buffer(s), and/or in response to an interface of the PPI. Based on data input into the batch buffers ready for processing, the BPM can instruct, or direct, components of the BPAS, such as a pre-processor and/or computational processor, to process data in the batch buffer(s). Alternatively, or additionally, the AEP can instruct (via an API of the BPAS, for example) a pre-processor or CP to process one or more buffers (e.g., a group of buffers) to initiate processing of batch data in the buffer(s) in the batch buffers, or can instruct a pre-processor or CP to process one or more buffers to initiate processing of batch data pending completion of transfer of the batch data to alternative buffers (e.g., a pre-process or CP buffer).

In stage 2A, the BPM (and/or another component of a BPAS) can determine that data in the batch buffer(s), transferred in stage 1A, requires pre-processing. The data batcher can indicate (e.g., via the PPI) to the BPM that data in one or more of the batch buffers requires or, may require, pre-processing. The BPM can determine that the data requires pre-processing based, for example, on determining a type and/or format of data included in the batch buffer(s), and/or based on an RDU, or type of CP of an RDU, allocated, or that can be allocated, to perform computational processing of the buffer(s).

Additionally, in determining that the buffer(s) requires pre-processing, in stage 2A the BPM can determine that data in the buffer(s) requires transfer to a buffer (e.g., a pre-process buffer) in a physical memory different from that in which the batch buffer(s) is/are located. For example, in stage 2A the BPM can transfer data (or, initiate a transfer of data) from a batch buffer in a host memory to a pre-process buffer in another region of the host memory, a pre-process buffer in another host memory or a memory of a runtime processor, or a pre-process buffer in a device memory of an RDU. The BPM can initiate the transfer and, optionally, can designate the batch buffer(s) as subsequently available to the data batcher (or, to other components of the BPAS) for reuse.

Based on the batch buffer(s) data requiring pre-processing, and/or completion of a transfer to another (pre-process) buffer, in stage 2A the BPM (or, alternatively, a pre-processor) can initiate pre-processing and/or transfer of batch buffer data. In stage 2A, the pre-processor can, optionally, indicate (e.g., signal via the PPI) to the BPM status of pre-processing and/or status of a transfer of the batch buffer data. Upon completing pre-processing, and/or transfer of batch buffer data, in 2A the BPM (and/or pre-processor) can transfer the batch/pre-process buffer to a computational processor.

Upon completion of pre-processing data in one or more pre-process buffer(s) (which can be the same as corresponding batch buffers) in 2A the BPM can submit the pre-process buffer(s), containing the pre-processed data, to the BPM for transfer to stage 3A for computational processing. Similar to stage 2A, in stage 3A the BPM can determine if transfer of data from a pre-process buffer (e.g., a pre-process buffer in a particular memory) to a computational buffer in an alternative memory, is required or advantageous (e.g., can provide better overall computational processing performance). For example, in stage 3A the BPM can transfer data (or, initiate a transfer of data) from a pre-process buffer in a host memory to a computational buffer in a device memory of an RDU. The BPM (or, another component of a BPAS) can initiate transfer of data from one or more pre-process buffers, in one memory, to computational buffers in an alternative memory and can determine a status of the transfer indicating that the transfer is complete. Upon determining the transfer is complete, in stage 3A the BPM can initiate processing of data in the pre-process buffer(s).

In stage 1A, the BPM (or, in stage 2A, a pre-processor) can determine that data in some or all of the batch buffers does not require pre-processing, and/or transfer to an alternative buffer. Accordingly, the BPM (or, in stage 2A, a pre-processor) can submit the batch buffer(s) for transfer to stage 3A for processing, bypassing pre-processing of data in the batch buffer(s) to transfer.

In response to, or in conjunction with, transferring the batch/pre-process Buffers from stage 1A or stage 2A to stage 3A, the BPM can, in stage 3A, instruct an RDU, or RPs of an RDU, to initiate computational processing of the transferred buffe(s). Similar to stage 2A, in stage 3A the BPM can determine to transfer data of the batch/pre-process buffers to computational buffers in an alternative memory. Upon completing the transfer of one or more of the stage 1A/2A buffers to computational buffers (which can be the same as the stage 1A/2A buffers), the BPM can initiate computational processing of the data in the computational buffers.

Additionally, in stage 3A, upon completing computational processing of computational buffers, the BPM can initiate transfer of data from a computational buffer (e.g., a physical memory of a computational buffer) to an alternative buffer, or other data structure, in the same or alternative memory.

For example, in stage 3A, upon completing computational processing of a computational buffer, the BPM can transfer, or can initiate transfer, of results data of the computational processing to a buffer, or other data structure, in an alternate region of the same memory, in a memory, or alternative region of, a memory of an AEP, or a memory of an alternative RDU (e.g., an RDU configured to perform computational processing of results of a predecessor RDU computation stage of an application execution pipeline).

In parallel with operations 2A and/or 3A, the data batcher can perform stage 1B to prepare additional batch data, such as batch 2 data, and can store batch 2 data in available buffers among those allocated in 1A. Optionally, while not shown in FIG. 1, in 1B the data batcher can allocate a buffer, similar to the manner described in reference to 1A, to store batch 2 data. In stage 1B, similar to stage 1A, the data batcher can submit batch buffers containing batch 2 data to the BPM for processing, in stage 2B the BPM and/or pre-processor can perform operations similar or equivalent to stage 2A, and in stage 3B the BPM and CPs can perform operations similar or equivalent to stage 3A.

Similarly, in parallel with operations 1B, 2B and/or 3B, the data batcher can perform stage 1C to prepare additional batch data, such as batch 3 data, and can store batch 3 data in available buffers among those allocated in 1A. Optionally, while not shown in FIG. 1, in 1C the data batcher can allocate a buffer, similar to the manner described in reference to 1A, to store batch 3 data. In stage 1C, similar to operations 1A and 1B, the pipelined application can submit batch buffers containing batch 3 data to the BPM for processing, in stage 2C the BPM and/or pre-processor can perform operations similar or equivalent to stage 2A and 2B, and in stage 3C the BPM and CPs can perform operations similar or equivalent to stage 3A and 3B.

FIG. 1 refers to buffers comprising data, and/or results of processing data, of data batches 1, 2, and 3 in each of stages 1, 2, and 3 of an application execution pipeline. However, this is not intended to limit implementations to processing all data elements of a batch of data in each stage and to collectively transfer buffers of each data batch to a successor stage processor, prior to operating on data in additional data batches (e.g., batches 2 and 3 in the example of FIG. 1). In implementations, a data batcher can perform operations of each of stages 1A, 1B, and 1C, of FIG. 1, serially or concurrently, and can transfer individual batch buffers of each stage to respective stages 2A, 2B, and 2C. The data batcher, pre-processor, and/or computational processor need not await transfer of all batch buffers of a particular data batch to initiate pre-processing or computational processing. Rather, in stage 2 and/or stage 3, a pre-processor and/or computational processor can initiate pre-processing or computational processing of individual buffers of stages 1A, 1B, and 1C as they become available, or ready, for pre-processing or computational processing. Similarly, in stage 3, a computational processor need not await transfer of all pre-process buffers of a particular data batch, and can initiate computational processing of individual buffers of stages 1A, 1B, and 1C, or stages 2A, 2B, and 2C, as they become available, or ready, for computational processing.

Thus, as shown in the example of FIG. 1, utilizing pipeline buffers a BPM can manage pipelining of data elements of various data batches of application data among a plurality of stage processors (e.g., a data batcher, pre-processor, and computational processor) to concurrently perform stage operations on individual data elements (e.g., individual tensors) in individual pipeline buffers. Importantly, too, based on an AEP, data batcher, compiler, and/or runtime processor having awareness of buffers in particular memories, a BPM can optimize placement of batch data in buffers of physical memories most suitable, or most advantageous, for processing the batch data. In implementations a BPM can direct a data batcher, pre-processor, and/or CP to access batch data in particular physical memories based on locations of pipeline buffers within particular virtual and/or physical memories.

A BPM can direct a stage processor to access batch data in particular physical memories by directing the stage processor to particular VA/PA locations of a buffer, without transferring batch data from one buffer to another. A BPM can direct a data batcher, pre-processor, and/or computational processor, for example, to access batch data in particular physical memories, by configuring ATL of a BPAS to map virtual addresses of buffers to physical addresses of the buffers in particular physical memories. Configuring ATL (e.g., modifying ATWS translated by ATL of the BPAS) can enable the BPAS to efficiently swap buffers among stage processors without transferring data among different buffers and/or different physical memories.

Figure 2:
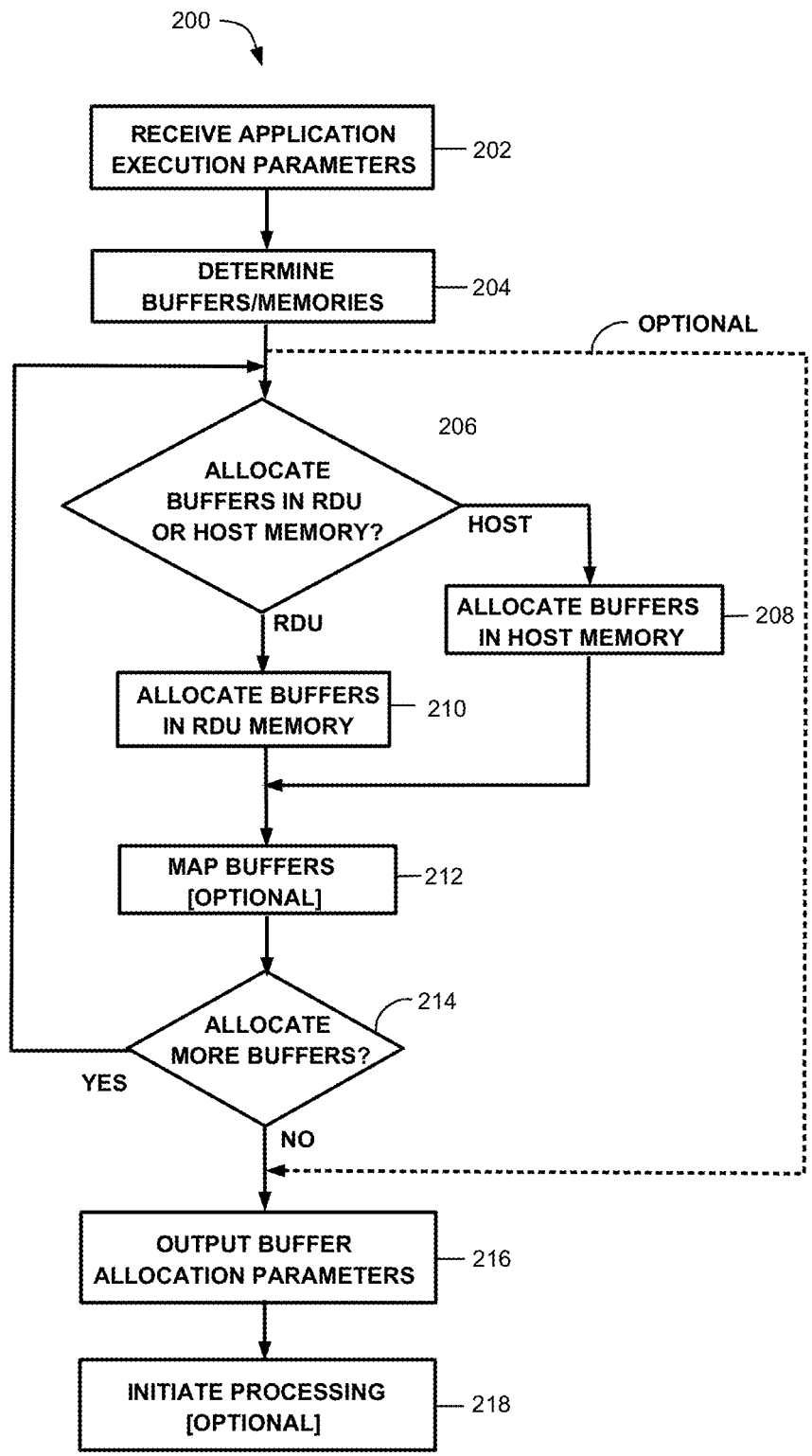
FIG. 2 illustrates an example method for allocating pipeline buffers, according to aspects of the disclosure.

FIG. 2 illustrates example method 200 that a BPAS can perform to allocate pipeline buffers, such as in the example of stage 1A of FIG. 1. For purposes only of illustrating the method, the method is described as performed by a BPM of a BPAS interacting with an AEP associated with a pipelined application (hereinafter, with reference to method 200, "the application"). For brevity, references to a "memory", in describing method 200, refer to a physical memory. In implementations, the BPM can execute on a runtime processor of a BPAS, for example, and/or the AEP can execute on a host processor, for example.

In operation 202 of FIG. 2, the BPM receives (and/or retrieves from a storage medium) execution parameters associated with executing a pipelined application. In operation 202 the BPM can receive the execution parameters via one or more parameter files, such as an execution parameter file output by an AEP, an execution file output from a compiler, and/or a configuration file output from a runtime processor. A BPM can receive execution parameters by retrieving or receiving a parameter file and/or via an interface of a PPI. In implementations, the execution parameters can specify particular application execution stages, and/or operations thereof, (e.g., batching, pre-processing, and/or computational processing) to utilize the buffers.

The execution parameters can specify, and/or be associated with, particular hardware components of a BPAS to execute particular execution stages of the application. The execution parameters can comprise outputs of an AEP, compiler, and/or a runtime processor of a BPAS, and can include allocation directives that specify buffer parameters and/or placement of particular buffers in particular memories. The execution parameters can identify a particular data batch, or a group of data batches, to input into the buffers using, for example, by a Group ID ("GID"). The AEP, BPM, and/or other components of the BPAS can identify individual data batches, or associate individual data batches with a particular data batch group, using a GID.

Execution parameters determined in operation 202 can include resource attributes, associated with BPAS hardware resources (e.g., memories, processors, and/or interconnection or processors and/or memories). An interface of a PPI can enable an AEP and/or runtime processor of a BPAS, for example, to determine resource attributes of hardware resources of a BPAS. Resources attributes of a BPAS can comprise, for example, performance, capacity, and/or topological attributes of memories and/or processing elements of the BPAS for executing the application, or executing particular stages of the application. Performance attributes can comprise, for example, bandwidths, data rates, and/or utilizations of BPAS processing resources. Capacity attributes can comprise, for example, sizes of memories, processing capacities of processors, and/or a number of processors (e.g., CPs), available and/or allocated to execute stages of the application. Topological attributes can comprise, for example, a number of hops through an interface fabric between a processor (e.g., an RDU or CP) and a memory (e.g., a host or RDU memory), and/or a particular type of interconnection (an interconnection fabric or bus), and/or interconnection interfaces (e.g., a memory bus, I/O bus, I/O link, or network interface), coupling processors and memories.

A PPI can include interfaces to enable an AEP and/or runtime processor to interact with a BPM, during execution of a pipelined application, such as to transfer pipeline buffers and/or data in pipeline buffers among stage processors. A BPM can pre-allocate buffers and a PPI can include interfaces to identify and/or request allocation of the buffers to particular stage processors and/or processing operations of stage processors. A BPM can allocate upon request (by an AEP, or runtime processors of a BPAS), or can pre-allocate, pipeline buffers based on resource attributes of memories and/or processors of the BPAS, and/or based on processing requirements of data batches in buffers or computations or transfer of batch data of particular execution stages. In some implementations, a PPI can include an interface (or, parameters of an interface) that can enable an AEP to directly allocate, or otherwise assign, a region of physical memory of the BPAS to one or more pipeline buffers. An AEP can determine to allocate buffers in a particular physical memory of the BPAS based on, for example, resource attributes of memories and/or processing elements of the BPAS.

Execution parameters, in operation 202, can include buffer parameters associated with pipeline buffers to use in executing the application and/or particular execution stages of the application and/or can indicate a preferred memory in which to allocate pipeline buffers. Buffer parameters can include particular memories in which the buffers are allocated and memory addresses of the buffers, such as virtual and/or physical address of the buffers. Buffer parameters can comprise VA spaces associated with the buffers. VA spaces can be an output of the AEP and/or a component of the BPAS (e.g., a runtime processor or kernel). The BPAS (e.g., a runtime processor or runtime kernel) can determine (e.g., assign) VA spaces associated with the buffers as part of initiating execution of the application, for example. The BPAS and/or BPM can establish ATWs for ATL to translate the VAs to PAs of memories containing the buffers, and can establish the ATWs based on VA spaces included in the buffer parameters. The BPAS (e.g., a runtime kernel of the BPAS) can pin regions of physical memories containing the buffers to associate the buffers with the VA spaces. The BPAS (or, components of the BPAS) can pin regions of any one or more particular memories of a BPAS, such a regions of particular host, runtime, and/or RDU memories of a BPAS.

In operation 204 the BPM determines a set of pipeline buffers, such as batch buffers, pre-process buffers, and computational buffers, and physical memories to contain the buffers, to allocate to execution stages of the application. The BPM can determine buffers and/or memories to contain the buffers based, for example, on resource attributes of memories and/or processors of the BPAS, and/or based on processing requirements of data batches in buffers or computations or transfer of batch data of particular execution stages.

The buffers can be the same buffer (i.e., contained in the same region of the same physical memory) or can comprise different buffers (i.e., contained in a different region of the same physical memory or in different physical memories). The buffers can have the same VA or can have differing VAs. The buffers can be allocated in memories accessible to hardware processors executing the data batcher, pre-processor, and/or computational processor, or can be allocated in memories most efficient for the data batcher, pre-processor, and/or computational processor to process data in the buffers.

In operation 204 the BPM can determine the buffers/memories based on the execution parameters received in operation 202. ABPM can allocate buffers in a particular physical memory of the BPAS based on, for example, resource attributes of memories and/or processing elements of the BPAS. As used herein, "allocating" buffers refers to allocating numbers, sizes, and types of pipeline buffers and regions of one or more memories to contain the buffers.

Allocating buffer can include associating the buffers with identities of the buffers (e.g., VAs and/or PAs of the buffers), and/or a use of particular buffers, such as batching, pre-processing, and/or computational processing. Based on the execution parameters, the BPM can select, in operation 204, particular memories to locate particular buffers based on determining if the buffers are to be allocated in a particular memory (e.g., a memory specified in execution parameters and/or directives) as well as logical, virtual, and/or physical addresses of the buffers, and/or whether processing of data in the buffers is more advantageous in one memory (e.g., a device memory) or another (e.g., a memory of a host or runtime processor).

A component of a BPAS, such as a compiler, runtime processor, runtime library or kernel of a runtime processor, can pre-allocate, or pre-determine, particular memories to contain particular buffers, and in operation 204 the BPM can allocate the buffers from the pre-allocated/pre-determined buffers/memories. Accordingly, in operation 204 determining the buffers can, comprise determining that the buffers are pre-allocated and that the BPM need not allocate buffers and memories to contain them, such that the BPM can, optionally, perform operation 216 to output the pre-allocated buffers In operation 206 the BPM determines a particular memory (and/or regions of a particular memory) to allocate to buffers associated with the data batch. The BPM can determine the memory based, for example, on the execution parameters and/or directives received in operation 202. The execution parameters and/or directives can specify particular memories to store data of a particular data batch for pre-processing and/or computational processing, for example. The execution parameters and/or directives can specify particular memories based, for example, on the type of pre-processing and/or computations to perform on data elements of a data batch, and/or a type or particular CP to perform pre-processing and/or computational processing of data elements of a data batch.

In operation 206 the BPM can determine a particular memory to store a data batch, or a portion thereof (e.g., a subset of data elements of the data batch) based on the particular BPAS resources (e.g., a particular host or runtime processor among nodes of a BPAS, and/or a particular RDU or CPs of an RDU) to process batch data in the buffers. The BPM can determine the memories based on pre-allocated/pre-determined buffers/memories determine in 204.

To simplify the illustration of method 200, but not intended to limit implementations, in operation 206 the BPM can determine whether to allocate pipeline buffers in a memory of an RDU and/or a host memory. However, it will be appreciated by one of ordinary skill in the art that a BPM can allocate buffers, in total or in subsets, among any of a variety of memories accessible to respective processing functions of a BPAS. Thus, in operation 206 the BPM can determine whether to allocate memory space for a data batch, or a set of data batches in RDU or host memory.

In 206 the BPM can determine to allocate memory in a host memory or, alternatively, in an RDU memory, based on, for example, the type of data elements included in the data batch, the size (e.g., total number of data elements or bytes of data) of the data batch, a pre-processing or computational function to perform on data elements of the data batch, and/or whether or not some or all data of the data batch will require pre-processing. In 206 the BPM can determine to allocate memory in a host memory or, alternatively, in an RDU memory, based on whether or not data stored in a buffer in host memory will subsequently require transfer to an RDU memory, or vice versa, and/or latencies to transfer data between buffers in a host memory (or, a particular host memory) and buffers in an RDU memory (or, a particular RDU memory).

In operation 206, the BPM can determine to allocate buffers in RDU memory, for example, based on computational processing latencies in RDU memory having a greater contribution to optimizing application execution performance compared to batching and/or pre-processing the batch data in RDU memory. Alternatively, or in addition with respect to some buffers, the BPM can determine to allocate buffers in host memory, for example, based on batching and/or pre-processing latencies in host memory having a greater contribution to optimizing application execution performance compared to computational processing in host memory.

In operation 206, the BPM can determine to allocate a set of buffers equal to the number of data elements of a data batch (or, equaling the total amount of data of the data batch), or to allocate a set of buffers fewer than the totality of data elements of the data batch. A BPM can pipeline transfer of batch data between buffers from one physical memory to another. For example, a BPM can pipeline transfer of data from a host memory (e.g., data buffered in host memory to prepare and input the data, pre-process the data, and/or computational process the data) to buffers in RDU memory (e.g., to pre-process and/or computational process the data).

If, in operation 206, the BPM determines to allocate the buffers in host memory, in operation 208 the BPM allocates one or more regions of a host memory to some or all of the buffers. The host memory can correspond, for example, to a host processor on which a data batcher and/or pre-processor can execute. Alternatively, in operation 206 if the BPM determines to allocate the buffers in RDU memory, in operation 210 the BPM allocates one or more regions of a host memory to some or all of the buffers. The RDU memory can correspond, for example, to an RDU on which a CP of the RDU is to execute computational processing of the buffered data.

In either of operations 208 and 210 the BPM can dynamically allocate host and/or RDU memory for the buffers (e.g., dynamically bind particular regions of a memory), and/or can allocate some or all of the buffers from a pool of pre-allocated buffers in the host and/or RDU memories. The BPM can determine in 206 whether to allocate RDU and/or host memory based on such a pool.

In operation 212, the BPM can, optionally, map some or all of the buffers allocated in operations 206-210 from VAs of the buffers to PAs of the buffer in a memory (e.g., a host or RDU memory), The BPAS and/or BPM can establish ATWs for ATL to translate the VAs to PAs of memories containing the buffers. In operation 212 mapping the VAs to PAs can comprise initializing and/or updating ATL of the BPAS to translate a VA of a buffer to a PA of the buffer in a memory using a particular ATW.

In operation 214 the BPM determines if there are more buffers to allocate. For example, in operation 204 the BPM can determine to allocate in a host memory a subset of the totality of buffers to allocate for buffering data elements of the data batch. In operation 214 the BPM can determine there are additional buffers yet to allocate and can repeat operations 206-214.

In operations 216 the BPM outputs buffer allocation parameters (e.g., virtual and/or physical addresses) corresponding to the memory and buffers allocated in operations 204-214. In operation 216, the BPM can output the buffer allocation parameters to, for example, a compiler, and/or runtime processor, of the BPAS, and/or to an AEP associated with the application. The BPM can output buffer allocation parameters to stage processors executing execution stages of the application, such as a data batcher, pre-processor, and/or computational processor.

In operation 216, buffer allocation parameters can include RDU and/or memory configuration information based on the buffers allocated in operations 208 or 210. The configuration information can instruct, or facilitate, the BPAS (e.g., a runtime processor of the BPAS) to configure particular hardware resources of the BPAS (e.g., hardware processors/memories of a BPAS) based on the buffers allocated in operations 208 or 210. In operation 216, the BPM can output such configuration information to a compiler, and/or runtime processor, of the BPAS, and/or to an AEP associated with the application, for example. In operation 216, outputting buffer parameters can include initializing, and/or configuring ATL of the BPAS to translate VAs of the buffers determine in operations 204 to PAs of the buffers allocated in memories determined in operations 204-210.

In operation 218, the BPM can, optionally, initiate stage processing operations (e.g., initiate a load stage, pre-process stage, and/or computation stage) utilizing the buffers. Initiating stage processing operations, in operation 116, can include, for example, initiating a data batcher filling the buffers with batch data of the data batch, and/or the BPM or a runtime processor configuring processors (e.g., host and/or RDU processor) and/or memories of the BPAS. In operation 218, initiating stage processing operations can include initializing and/or configuring ATL, and/or modifying an address translation window, to translate VAs of the buffers determine in operation 204 to PAs of the buffers allocated in memories determined in operations 204-210.

Initiating stage processing, in operation 218, can include initiating a plurality of pre-processors and/or CPs to process data batches within one or more groups of buffers. For example, as previously described, an AEP can organize a set of buffers as a group and can submit the buffers to the BPAS (e.g., transfer to a pre-processor or CP of the BPAS, or initiate BPAS processing of the buffers) as a group). A plurality of processors of the BPAS can process individual buffers within the group (although, in some implementations, only one processor of a group can process any one particular buffer at one time), so as to process the group of buffers in parallel. The group need not require that the BPAS process the buffers within the group in any particular order, such that the BPAS (or, the BPM) can select buffers within the group for processing in a manner that maximizes overall processing performance of the BPAS (e.g., maximizes resource utilization, minimizes data transfer latencies, or maximizes BPAS processor throughput) with respect to that group.

Figure 3A:
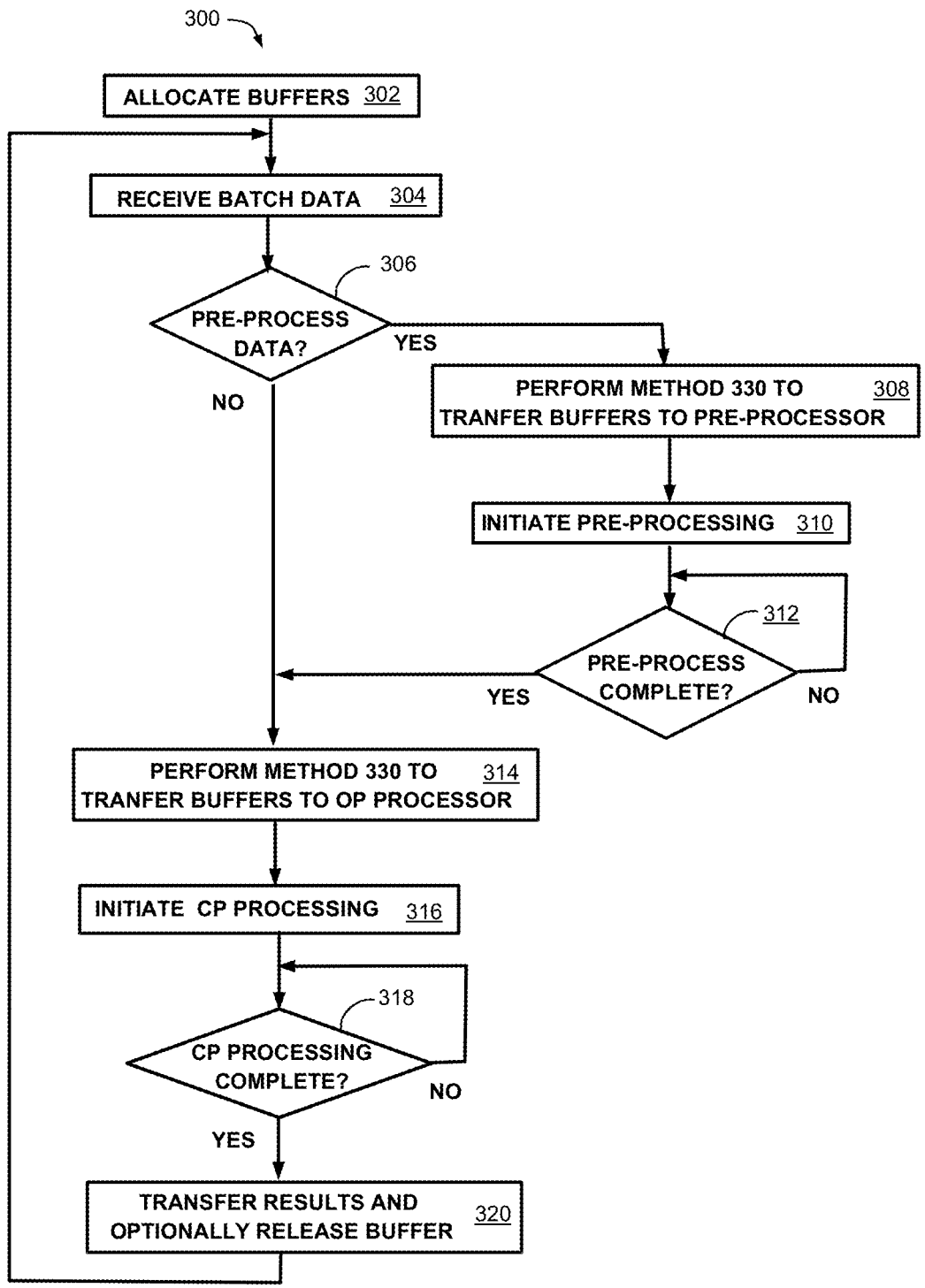
FIG. 3A illustrates an example method of pipelining execution of stages of a computing application using pipeline buffers, according to aspects of the disclosure.

FIG. 3A illustrates example method 300 that a BPAS, or components thereof, can perform to pipeline execution stages of a pipelined application (hereinafter, with reference to method 300, "the application") interactively with an AEP. For purposes only of illustrating the method, but not intended to limit implementations, method 300 is described as pipelining application data and processing results in pipeline buffers among a data batcher, pre-processor, and computational processor. Similar to the description of method 200 in FIG. 2, for purposes only of illustrating the method, method 300 is further described as performed by a BPM of a BPAS to execute the application using pipeline buffers comprising data batches of application data and results of processing the data batches. For brevity, references to a "memory", in describing method 300, refer to a physical memory containing buffers among a set of pipeline buffers.

In operation 302 of method 300, the BPM allocates buffers to buffer application data during execution of the application. In operation 302, the BPM can allocate the buffers, for example, by performing method 200, or a method similar or equivalent to method 200, of FIG. 2. A PPI can include an ALLOCATE interface to allocate the buffers, and/or the buffers can be allocated via an interface of a compiler, and/or a UI of a runtime kernel or library. The allocation interface(s) can specify a particular number of buffers, sizes of buffers, types of buffers, and/or particularly memories in which to include buffers. An AEP and/or runtime program can invoke an ALLOCATE interface of a PPI to allocate the buffers, and/or to determine buffer parameters.

In operation 302, the BPM can communicate buffer parameters, such as described in reference to operation 204 of method 200 in FIG. 2, to an AEP, stage processor (e.g., a data batcher) and/or a runtime processor, for example. The BPM can communicate buffer parameters as, for example, return operands of an ALLOCATE interface of a PPI. The buffer parameters can correspond to buffers allocated in response to the ALLOCATE interface, and/or can correspond to pre-allocated (e.g., by a compiler or runtime processor of a BPAS) buffers.

Additionally, or alternatively, in operation 302 the BPM can configure access to memories containing the buffers by one or more stage processors. In implementations, configuring access to a buffer can comprise configuring hardware components of a BPAS, such as described in the example of method 200 of FIG. 2.

In operation 304, the BPM receives batch data input into, or to input into, one or more buffers among those allocated in operation 302 (hereinafter, in reference to method 300, an "input buffer"). For example, a data batcher can utilize a "LOAD" interface of a PPI to input batch data into one or more input buffers. Such a LOAD interface can enable a data batcher to input a single data element of a data batch (e.g., a single tensor), or can enable a data batcher to input multiple data elements of a data batch (e.g., multiple tensors). The LOAD interface can enable the data batcher to input data elements as data already stored in input buffers among the buffers allocated in operation 302. Alternatively, or additionally, the LOAD interface can enable the data batcher to input data elements as arguments of the LOAD interface (e.g., pointers to data in a particular memory location of the data batcher) and the BPM can store the input data in input buffers among the buffers allocated in operation 302. In operation 304 a BPM can receive data elements via the LOAD interface.

In operation 304, a LOAD interface of a PPI can specify a particular buffer to store a data element input by a data batcher. A PPI can include an interface, such as a GET-BUFFERPARMS interface for a data batcher to determine an available buffer for use as an input buffer, and/or to determine parameters of one or more allocated buffers (e.g., a size of a buffer and/or VA/PA of a buffer). A data batcher can, in operation 304, specify the available buffer (e.g., using a VA or PA of the buffer, or type of the buffer) as a parameter of the LOAD interface. Additionally, or alternatively, in response to a LOAD interface a BPM can determine an available buffer, among those allocated in operation 302, and/or parameters associated with a particular buffer, in which to store a data element.

Alternatively, or additionally, a LOAD interface of a PPI can enable a data batcher to specify a type of buffer to use as an input buffer, among the allocated buffers, and the BPM can defer data input to the buffer until a particular buffer among those allocated in 302 is available (e.g., no longer pending use, or in use, by a pre-processor or computational processor operating on data previously input to that buffer).

A data batcher can directly store batch data in an input buffer and a PPI interface (e.g., a LOAD interface or alternative interface of the PPI) can indicate to a BPM that a buffer contains batch data ready for processing (e.g., by a pre-processor or computational processor). As previously described, a data batch can be associated with an identifier (e.g., a GID), and the LOAD interface can include an identifier parameter, such as a GID parameter, to associate input data elements, and/or input buffers, with a particular data batch. Inputting a data element into an input buffer can include a status, or signal, to the BPM that data in an input buffer is ready for pre-processing or computational processing.

A data batcher can input data elements that require pre-processing and, in operation 306, the BPM determines if some or all of the data elements among the input buffers require pre-processing. The BPM can perform operation 306 in response to a data ready status indicating there is data ready to process in a batch buffer received in operation 304. The data ready status can be result of executing the LOAD interface. Alternatively, a PPI can include a RUN interface, which can initiate processing, by stage processors of the BPAS, of data in batch buffer, or set of batch buffers. A BPM can perform operation 306 in response to executing a RUN interface of a PPI.

If data in input buffers require pre-processing, in operation 308 the BPM transfers the buffers to one or more pre-processors. In operation 308 the BPM can transfer each input buffer, received in operation 304, to the pre-processors as the respective input buffers become ready for pre-processing (e.g., data is completely loaded into a buffer via a LOAD interface of a PPI). Alternatively, in operation 308 the BPM can transfer a set of input buffers (e.g., an input buffers of a group of data batches), received in operation 304, to the pre-processors as the set of input buffers become ready for pre-processing. The BPM can transfer the buffers to the pre-processors as VAs of the buffers. The BPM can utilize the VAs of the input buffers as VAs of pre-process buffers or, alternatively, can determine alternate VAs of the buffers for use by the pre-processor(s) as pre-process buffers.

In operation 308, the BPM can perform a method such as example method 330 of FIG. 3B (to be described below) to perform the transfer. Using a method such as example method 330, a BPM can determine to process data elements in a memory that contains an input buffer (or, buffers) or to transfer some or all of the data elements of input buffers to an alternative (pre-process) memory for pre-processing. Using a method such as method 330 the BPM can, in operation 308, determine to map a VA of an input buffer to a PA of the buffer in a pre-process memory, and/or can remap a VA of an input buffer (e.g., modify ATL of a BPAS to translate the VA of the input buffer) to a PA of a pre-process buffer in a computational memory.

In operation 310, the BPM initiates pre-processing of data elements in pre-process buffers. For example, in operation 310, the BPM can signal a runtime processor (e.g., a thread of a runtime processor) and/or an RDU, or CP of an RDU (e.g., via a status signal, concurrency primitive, or interrupt), that a pre-process buffer is ready to process. Additionally, or alternatively, in operation 310 one or more threads executing on a runtime processor, and/or one or more RDUs, can monitor status of computational buffers to determine that the buffers are ready for pre-processing.

In operation 312 the BPM determines if pre-processing of buffers, initiated in operation 310, has completed. In operation 312, the BPM can monitor and/or receive a status of the pre-processor(s) to indicate that pre-processing of data has completed and the data is ready for computational processing. For example, a BPM (e.g., a thread of a BPM or runtime processor) can periodically poll a status associated with a pre-processor operating on a pre-process buffer, and/or, can receive an interrupt from the pre-processor, to determine that the pre-processor has completed processing of the buffer. The BPM can repeat operation 314 for the pre-process buffer, and/or one or more additional pre-process buffers (which can comprise input buffers) pending completed pre-processing of those buffers.

If the BPM determines, in operation 312, that pre-processing is complete, in operation 314 the BPM transfers the pre-process buffers to one or more computational processors. Additionally, if the BPM determined, in operation 306, that some or all of the input data elements received in operation 304 did not require pre-processing, in operation 314 the BPM transfers the input buffers to one or more computational processors.

In operation 314 the BPM can transfer each pre-process or input buffer to the computational processors, as computational buffers, as the pre-process/input buffers become ready for computational processing (e.g., complete pre-processing or are input to the input buffers via a LOAD interface of a PPI). Alternatively, in operation 314 the BPM can transfer a set of pre-process and/or input buffers to the pre-processors as the set(s) of buffers become ready for computational processing.

Figure 3B:
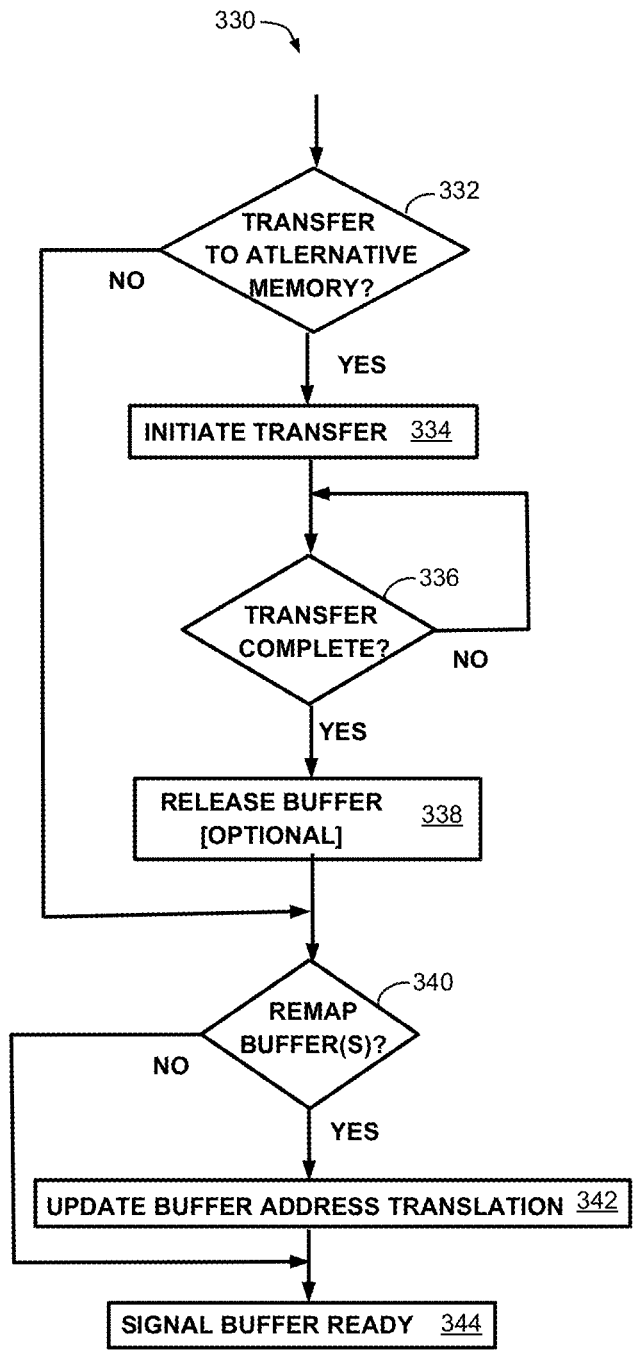
FIG. 3B illustrates an example method of transferring pipeline buffers among execution stages of a computing application, according to aspects of the disclosure.

Similar to operation 308, in operation 314 the BPM can perform a method such as example method 330, of FIG. 3B, to perform the transfer. Using a method such as example method 330, a BPM can determine to process data elements in a memory that contains the pre-process/input buffers or to transfer some or all of the data elements of the pre-process/input buffers to an alternative (computational) memory for computational processing. Also similar to operation 308, in a method such as method 330 the BPM can determine to map a VA of a computational buffer to a PA of the buffer in a computational memory, and/or can remap a VA of a pre-process/input buffer (e.g., modify ATL of a BPAS to translate the VA of the pre-process/input buffer) to a PA of a computational buffer in a computational memory.

In operation 316, the BPM initiates computational processing of data elements in the computational buffers. For example, in operation 316, the BPM can initiate signal a runtime processor (e.g., a programming thread of a runtime processor), and/or an RDU, or one or more CPs of an RDU (e.g., via a status signal, concurrency primitive, or interrupt), that a computational buffer is ready to process. Additionally, or alternatively, in operation 316 one or more RDUs can monitor status of computational buffers to determine that the buffers are ready for computational processing.

In operation 318 the BPM determines if computational processing initiated in operation 316 is complete for one or more buffers. In operation 318 the BPM can, for example, monitor and/or receive a status of the computational processor(s) to indicate that computational processing of data has completed. For example, a BPM (e.g., a thread of a BPM or runtime processor) can periodically poll a status associated with a computational processor operating on a computational buffer, and/or, can receive an interrupt from the computational processor, to determine that the computational processor has completed processing of the buffer. The BPM can repeat operation 318 for one or more computational buffers pending completed computational processing of those buffers.

If the BPM determines, in operation 318, that computational processing is complete, in operation 320 the BPM can, optionally, transfer results of the computational processing from the computational buffer to an output memory. Computational processing of a data element, initiated in operation 316, can, for example, produce in a computational buffer computational results of RDU processing the data element (e.g., results of a GeMM operation on a tensor). The RDU (or, alternatively, the BPM, based on determining in 318 that the computational processing is complete) can store results of the computational processing in an alternative buffer or memory, such as a buffer or memory of an AEP or data batcher. Based on the RDU storing the results in the alternative buffer or memory, in operation 320 the BPM can release the computational buffer (and/or region of a computational memory) to make it available for further input, pre-processing, and/or computational processing of additional application batch data and/or processing results. Releasing a computational buffer, in operation 320, can comprise remapping VAs translating the computational buffer to a physical memory.

Additionally, or alternatively, an RDU, for example, can store results in a computational buffer for subsequent computational processing by the RDU, or an alternative RDU. For example, an RDU can store results of tensor computations that can be processed by the same or alternate RDU in a gradient descent algorithm. In the event that the same, or an alternative, RDU performs additional computational processing of results stored in the computational buffer, in operation 320 the BPM can determine to defer release of the computational buffer pending completion (and, transfer to an alternate memory) of the additional computational processing.

In operation 320 the BPM can additionally, or alternatively, determine to transfer, to an alternative memory, results data stored in a computational buffer in a particular computational memory for subsequent computational processing (e.g., gradient descent processing) by the same or an alternative RDU, or for subsequent processing by an alternative stage processor, such as a data batcher to batch the results with other input data, and/or a pre-processor to perform pre-processing of the results for subsequent computational processing. In operation 320 the BPM can transfer the results data using, for example, a method such as method 330 of FIG. 3B, similar to the manner described with reference to operations 308 and 314. Upon completion of transfer of the results data, in operation 320 BPM can release a computational buffer (and/or a region of a computational memory containing the buffer) to make it available for further subsequent application stage processing (e.g., input, pre-processing, and/or computational processing.)

Concurrent with the BPM performing any of operations 304-320 on any particular buffers among the pipeline buffers, a data batcher can continue to input data elements into available input buffers among the pipeline buffers, a pre-processor can continue to pre-process data elements in pre-process buffers among the pipeline buffers, and/or a computational processor can continue to process data elements in computational buffers. The BPM can repeat operations among operations 304-320 with data elements newly input into input buffers and/or results of pre-processing initiated in operation 310 and/or computational processing initiated in operation 316.

In implementations, execution of an application can comprise more than 3 stage processors such as data batching, pre-processing, and computational processing in the example of method 300. In pipelined applications execution of an application can involve many successive stage, and an AEP and/or BPM can utilize pipeline buffers to pipeline additional execution stages in the same manner as illustrated in the example of method 300. In some applications, results of computational processing initiated in operation 316 and stored in a computational buffer can be inputs to a successive execution stage and stage processors.

For example, outputs of a GeMM operation can be inputs to a ReLu (Rectified Linear Unit) (or CONV (convolution) operation in a machine learning algorithm. The GeMM outputs can, optionally, require pre-processing to transform data in a buffer for the successor stage processor. Thus, in operation 320 the BPM can transfer a computational buffer to a successor pre-processor or computational processor in another execution stage of an application execution pipeline. In operation 320, the BPM can transfer the buffer using a method such as method 330 of FIG. 3B, or in a manner of a method similar or equivalent to method 330. The BPM can perform operations 306-320 on the transferred buffer.

Method 330 in FIG. 3B illustrates an example method to transfer buffers among stage processors. Similar to the description of method 300 in FIG. 3A, for purposes only of illustrating the method, but not intended to limit implementations, method 330 is described as performed by the BPM of method 300 with respect to buffers among buffers allocated in operation 302 of method 300 and transferred in operations 308, 314 and/or 320.

In operation 332 the BPM determines if data in a stage buffer can be processed, or can be efficiently processed, by a particular stage processor. A stage processor can process data in a stage buffer (e.g., store input data elements in a batch buffer, pre-process data, and/or computational process data) if the stage processor can access the buffer in a memory containing the buffer (e.g., can reference a VA or PA of a buffer in a particular memory). For example, a data batcher can execute on a CPU of a host system, a pre-processor can execute on a CPU of a host system and/or runtime processor, and a computational processor can execute on a processor of an RDU.

Access to a buffer in a particular memory can be dependent on, for example, whether a hardware processor has a communicative interface to the memory (e.g., an interface to a memory bus, processor fabric, and/or network). In another example, access to a buffer in a particular memory can be dependent on whether or not a reference to a VA of the buffer can be translated by ATL of a hardware processor executing the reference. In operation 332 the BPM receives a buffer to transfer and determines whether to transfer data in the transfer buffer (hereinafter, with reference to method 330, the "from-buffer"), as contained in one memory, to a buffer contained in an alternative memory (hereinafter, with reference to method 330, the "to-buffer").

In transferring a buffer, or data contained in a buffer, from one stage processor (e.g., a data batcher) to a successor stage processor (e.g., a pre-process or computation stage processor), the BPM can transfer data from a from-buffer in one memory to a to-buffer using memory copy instructions, of a DMA operation. Alternatively, or additionally, a BPM can transfer a from-buffer to another stage processor by re-mapping a VA of the buffer in an ATW to a VA or PA of the buffer in the same or a different memory.

The BPM can, in operation 332, determine to transfer the data to a to-buffer, for example, based on a successor stage not having access to data in the from-buffer (i.e., access to data in the memory, or region of the memory, containing the from-buffer) and the successor stage having access to the to-buffer in the alternative memory. In operation 332, a BPM can determine to transfer the data based on the receiving stage processor having more efficient or better performing access to an alternative memory. For example, a processor of an RDU can have higher performance access to a device memory than to a memory of a host system. A BPM can determine, in operation 332, to transfer data from a from-buffer in one memory to a to-buffer in an alternative memory if the overall performance of access to the data in the alternative memory outweighs the performance cost of latency to transfer the data to to-buffer in the alternative memory.

If the BPM determines to transfer data from the from-buffer to the to-buffer (which can comprise transferring all of the data in the from-buffer or, alternatively, can comprise transferring only a portion of the data in the from-buffer), in operation 334 the BPM initiates the transfer. In operation 334, the BPM can, for example, initiate a DMA or sequence of read/write operations (e.g., processor and/or memory mapped I/O read/write instructions) to transfer the data to the to-buffer. The BPM can itself perform the transfer (e.g., can perform a sequence of read/write operations) or can initiate a hardware element (e.g., a DMA engine) to perform the transfer. In the event that there is not a region of an alternative memory available to transfer data from the from-buffer and data, the BPM can, in operation 334 the BPM can defer the transfer pending availability of a region of the alternative memory to store the from-buffer data.

In operation 336, the BPM can determine that the transfer is complete. The BPM can determine that the transfer is complete based on a status of a hardware element (e.g., a DMA engine) performing the transfer, or based on completion of a read/write sequence to copy the data from the from-buffer to the to-buffer. The BPM can, for example, periodically poll a status, or can suspend and resume processing of a thread of the BPM (or, a thread of another software component of the BPAS) using a synchronization primitive associated with completion of the transfer. The BPM can determine the transfer is complete in response to an interrupt from a hardware component performing the transfer.

If in operation 336 the BPM determines that the transfer is not complete, the BPM can repeat the determination (e.g., repeat a status poll) or, alternatively, in operation 336 can suspend processing of the buffer (e.g., successor stage processing) pending an interrupt or synchronization primitive to indicate the transfer is complete.

As a result of the transfer, the BPM can optionally, in operation 338, release the from-buffer for subsequent use by another execution stage (e.g., a data batcher to input new batch data, a pre-processor to pre-process other input data, and/or a computational processor to process additional input or pre-processed). In releasing a from-buffer a BPM can add the buffer to a pool of free buffers. Regions of physical memories to contain the buffers can be pinned for use by particular stages, and/or use by processors executing particular stages, of the application. Accordingly, in operation 338, the BPM can unpin a region of a physical memory corresponding to a released buffer.

In operation 340 the VA can determine to remap a VA of the from-buffer and/or to-buffer to another PA. In operation 340 the BPM can determine to remap a VA of a from-buffer as a result of, or in conjunction with, transferring a from-buffer to a to-buffer for use by another stage processor, and/or in conjunction with releasing a from-buffer for reuse. The BPM can remap a PA of a transferred buffer in a physical memory to a different VA, used by another stage processor, or to a VA associated with a pool of buffers (e.g., a pool of free buffers), and/or can remap a VA of a buffer to a PA of the buffer in an alternate physical memory. In operation 340, the BPM can invalidate a translation of a VA of a released buffer, so as to not be allocated to a region of a memory while in the pool, or can update ATL of the BPAS to translate a VA of the from-buffer to a different region of the memory originally containing the from-buffer.

In operation 332 a BPM can determine that data in a transfer buffer need not necessarily be transferred to an alternative to-buffer and can omit operations 334-338 in transferring the buffer to the successor stage processor. However, a VA of a transfer buffer input to method 330 can be a VA of the buffer in a virtual address space of a predecessor stage processor (e.g., a data batcher) and a VA of the buffer as referenced by a successor stage can be a different VA. For example, a VA of batch input buffer can have a VA of the buffer in a virtual address space of a data batcher (a predecessor stage processor), and a VA of the buffer as a pre-process buffer can be a VA of the buffer in a virtual address space of a pre-processor (a successor stage processor). Thus, in operation 340 the BPM can determine to remap a transfer buffer based on a VA of the transfer buffer being in different address spaces of different (e.g., predecessor and successor) stage processors.

If the BPM determines, in operation 340, to remap a from-buffer and/or to-buffer, in operation 342 the BPM performs the remapping. Remapping a from-buffer and/or to-buffer, in operation 342, can comprise updating ATL (e.g., modify an ATW used by the ATL) of a BPAS, such as previously described.

In operation 344 the BPM signals that the buffer received in operation 332 for transfer to the successor stage processor. The BPM can, for example, set a status of the to-buffer indicating to a corresponding stage processor (e.g., a stage processor receiving the buffer as an input). The BPM can set a synchronization primitive (e.g., unblock a thread) to indicate the to-buffer is ready for processing. The BPM can interrupt a stage processor to indicate, to the stage processor, that the to-buffer is ready for processing.

Figure 4:
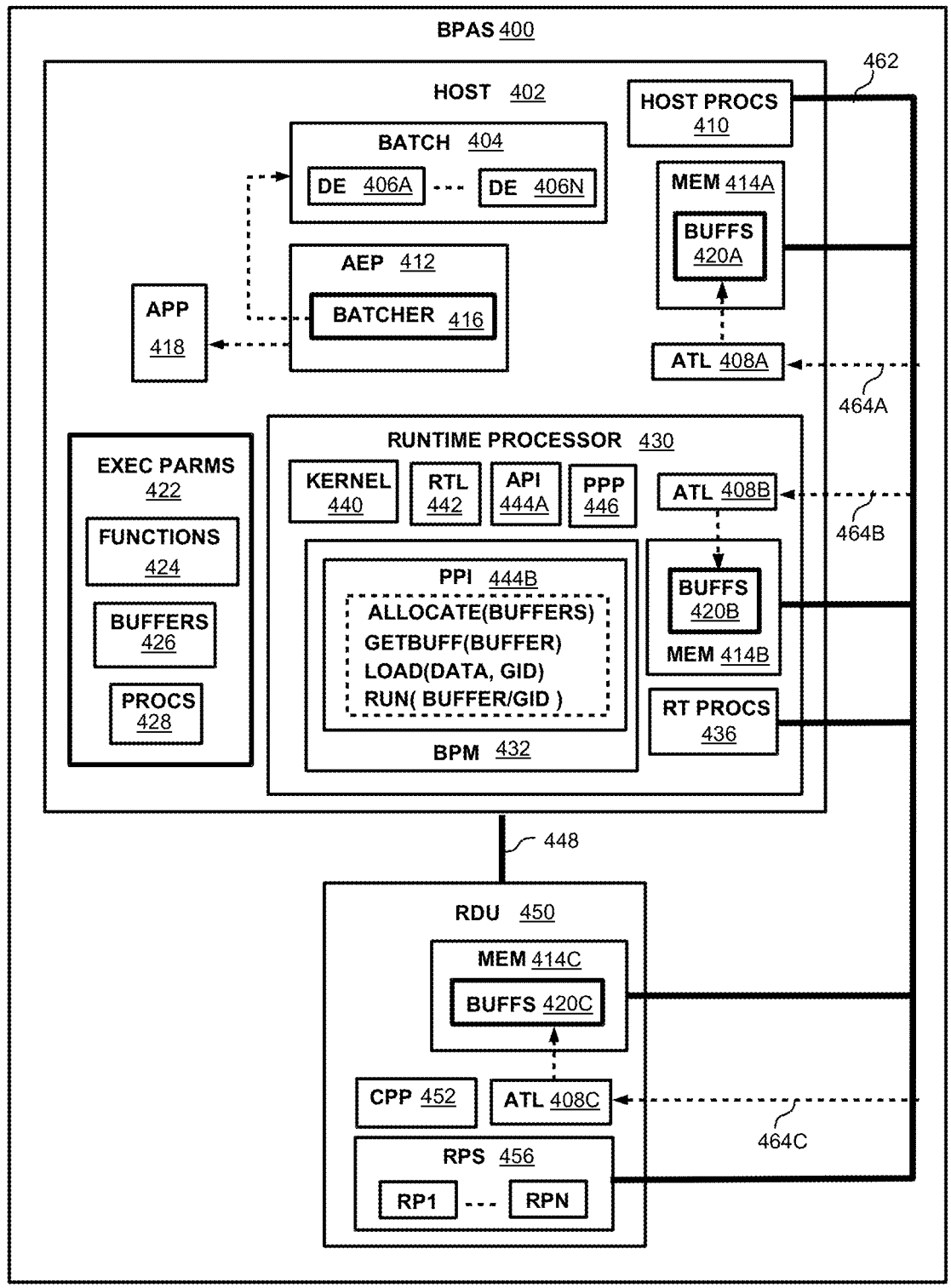
FIG. 4 is a block diagram illustrating an example computing system for executing pipelined applications, according to aspects of the disclosure.

FIG. 4 illustrates an example implementation of a BPAS that can pipeline AEP and pipelined application processing (e.g., data batching, pre-processing, and computational processing) to execute a pipelined application. In FIG. 4, example BPAS 400 can comprise, for example, an RDS such as illustrated in the examples of Grohoski and Kumar. In FIG. 4, example BPAS 400 is shown comprising host 402 and RDU 450. In implementations, host 402 can comprise a host processor, or host computing system, such as described in Grohoski and Kumar. FIG. 4 depicts host 402 comprising data batch 404, ATL 408, host processor host procs 410, application execution program AEP 412 mem 414A, pipelined application APP 418, application execution parameters exec parms 422, and runtime processor 430.

In implementations, APP 418 can comprise a pipelined application and AEP 412 can comprise an application execution manager that can interact with components of BPAS 400 (e.g., programs of runtime processor 430) to execute APP 418 on BPAS 400. FIG. 4 further illustrates AEP 412 comprising batcher 416. In implementations, AEP 412 and/or batcher 416 can comprise programs that can interact with BPAS 400 (e.g., a runtime program of BPAS 400) to execute a pipelined application on BPAS 400. Batch 404 can comprise a plurality of data elements of a pipelined application (e.g., tensors of the pipelined application), shown in FIG. 4 as "N" number of data elements, 406A—406N (hereinafter, collectively, "DEs 406").

Batcher 416 can comprise a data batcher, such as previously described and/or can comprise programs that can batch DEs 406 as data batch 404, and/or interact with a buffer pipeline manager to pipeline BPAS processing of the application data. AEP 412 can, for example, receive a stream of input application data and data batcher 416 can subdivide the input application data into batch 404 (and/or DEs 406) and/or similar data batches. Data batcher 416 can generate batch 404 in a manner, for example, similar or equivalent to that described with reference to operation 304 method 300 of FIG. 3A.

Host procs 410 can comprise, for example, a processor such as a CPU, core of a CPU, or processor thread of a multi-threaded CPU, and/or can comprise one or more processors of a computing system (not shown in FIG. 4) communicatively coupled to host 402. Host procs 410 can execute one or more program threads (not shown in FIG. 4) to execute programs of host 402, such as programs of AEP 412 and/or batcher 416.

Runtime processor 430 is shown, in FIG. 4, comprising BPM 432, memory mem 414B, RT procs 436, address translation logic ATL 408B, kernel 440, runtime library RTL 442, and pre-processor PPP 446. In implementations, RT procs 436 can comprise, for example, a processor such as a CPU, core of a CPU, or processor thread of a multi-threaded CPU, and/or can comprise a processor of host procs 410. RT procs 436 can comprise a processor of host procs 410, and/or can comprise an accelerator, such as one or more GPUs, TPUs, IPUs, FPGAs and/or CGRA such as an RDU and/or RP as illustrated by Grohoski and Kumar.

Kernel 440 can comprise an operating system kernel, such as illustrated by the example of kernel 322 in Kumar FIG. 4, and RTL 442 can comprise a runtime library such as illustrated by the example of runtime library 312 in Kumar FIG. 4. PPP 446 can comprise a pre-processor such as previously described, and can pre-process batch data in pipeline buffers for subsequent computational processing by processors of RDU 450.

BPM 432 can comprise a BPM such as previously described. For example, BPM 432 can perform methods such as method 200 of FIG. 2, method 300 of FIG. 3A, and/or operations of these methods, to allocate pipeline buffers (e.g., batch, pre-process, and/or computational buffers) and/or to manage processing and/or transfer of application data among pipeline buffers. Programs of kernel 440, RTL 442, BPM 432, PPP 446, can comprise programs executable on processors among host procs 410 and/or RT procs 436.

API 444A and PPI 444B (hereinafter, collectively, "APIs 444") can comprise APIs of BPAS 400 to facilitate execution of APP 418 by BPAS 400 and/or pipelining execution operations utilizing pipeline buffers. Programs of API 444A, and/or PPI 444B can comprise programs executable on processors among host procs 410 and/or RT procs 436. API 444A can comprise, for example, an API of kernel 440 and/or RTL 442, such as an API to perform functions of kernel 440 and/or RTL 442 similar to functions illustrated in the examples of Kumar FIG. 4.

API 444B is illustrated in FIG. 4 as a PPI of BPM 432, and can comprise a PPI such as previously described. For example, PPI 444B can include functions and/or APIs to enable a data batcher to perform operations of methods such as method 200 and/or 300 to allocate and/or process pipeline buffers (e.g., to input batch data, and/or pass buffers containing batch data, to BPM 432 and/or PPP 446). While shown in FIG. 4 as a component of BPM 432, this is not intended to limit implementations and PPI 444B can be a component, in whole or in part, of BPAS 400 other than BPM 432, including components not explicitly shown in FIG. 4 but that can be components of BPAS 400 utilized in executing pipelined applications on resources of BPAS 400.

API 444B is shown in FIG. 4 comprising functions ALLOCATE(BUFFERS), GETBUFF(BUFFERS), LOAD (DATA, GID), and RUN(BUFFER/GID). In implementations, ALLOCATE(BUFFERS) can comprise a function of API 444B to enable an AEP and/or data batcher to request a BPAS (e.g., BPM 432 of BPAS 400) to allocate pipeline buffers, such as illustrated in operation 302 of method 300 in FIG. 3A. FIG. 4 illustrates pipeline buffers buffs 420A allocated in memory mem 414A, buffs 420B allocated in memory mem 414B, and buffs 420C allocated in memory mem 414C. Buffers among buffs 420A, 420B, and/or 420C (collectively, "buffs 420") can comprise, for example, batch (application data input) buffers, pre-process buffers, and/or computational buffers for pipelining data batching, pre-processing, and computational processing of application data. BPM 432 can allocate buffers among buffs 420, among memories mem 414A, mem 414B, and/or mem 414C, in a manner similar or equivalent, for example, to method 200 of FIG. 2.

Additionally, using an interface such as ALLOCATE (BUFFERS), an AEP can direct the BPM to place particular buffers in particular memories of a BPAS, such as to place batch buffers in a host memory, such as mem 414A; to place pre-process buffers in a memory, for example, of a runtime processor (e.g., mem 414B); and/or, to place computational buffers, for example, in a memory of an RDU, such as mem 414C. The AEP can direct the BPM to place particular buffers in particular memories based, for example on execution parameters associated with an execution stage of an application.

GETBUFF(BUFFERS) can comprise a function of API 444B to enable a data batcher to access an available buffer among pipeline buffers, such as to input batch data of batch 404 into available buffers among buffs 420. LOAD(DATA, GID) can comprise a function of API 444B to enable a data batcher to input data into an available buffer among buffs 420, such as in the example of operation 304 of method 300 in FIG. 3A. A GID in the LOAD function of API 444B can, for example, identify DATA input in the LOAD function as belonging to a particular data batch, such as batch 404. A RUN interface of a PPI can initiate execution of a stage processor to execute a corresponding application stage on a buffer, or set of buffers.

A RUN interface can include a parameter specifying a buffer, or set of buffers, to process by an execution stage, and/or can include a GID identifying a data batch to process by an execution stage. The BPM, and/or a stage processor of a BPAS, can operate on one or more buffers based on a BUFFER or GID parameter of the RUN interface. For example, a data batcher can invoke a LOAD interface to load application data into a buffer, or set of buffers, among buffs 420, and the data batcher can invoke a RUN interface to initiate pre-processing or computational processing of one or more of the buffers. A runtime processor, for example, can invoke a RUN interface to initiate pre-processing and/or computational processing of a buffer, and/or can invoke a RUN interface to initiate a BPM performing operations of a method, such as operations of method 200 in FIG. 2, method 300 in FIG. 3A, and/or method 330 in FIG. 3B.

FIG. 4 illustrates RDU 450 comprising mem 414C, reconfigurable processors RPs 456, address translation logic ATL 408C, and CPP 452. In implementations RDU 450 can comprise an RDU such as previously described, and can be an RDU of a node, or can comprise a node, for example, of a BPAS such as illustrated by the examples of Kumar (e.g., Kumar FIG. 10). RDU 450 can comprise one or more reconfigurable processors, shown in FIG. 4 as "N" number of RPs, RP1—RPN (as shown in FIG. 4, collectively, "RPs 456"). RPs among RPs 456 can comprise, for example, such as one or more tiles, and/or subarrays of PCUs/PMUs, of RPs in the example of Grohoski and Kumar. While not shown in FIG. 4 explicitly, in implementations RPs among RPs 456 can include I/O interfaces, such as memory or processor fabric bus interfaces; switching networks, such as a TLN; and/or IO bus interfaces, such as PCI, PCI-Express, and/or D3 interfaces.

CPP 452 can comprise a program, and/or hardware elements of one or more of RPs 456, that can perform computational processing of pipelined application data (e.g., application functions such as GeMM, matrix transpose, gradient descent) and can be configured to perform particular such operations (e.g., GeMM or gradient descent computations). Programs of CPP 452 can execute, for example, on processors among RPs 456.

Turning more particularly to memories mem 414A, mem 414B, and mem 414C (hereinafter, collectively, "memories 414") of BPAS 400, mem 414A of host 402 can comprise a physical memory of host 402, and/or a physical memory communicatively coupled to host 402 (e.g., to host procs 410 of host 402). Mem 414A can store instructions of programs executing on, for example, host procs 410 and/or RT procs 436. Mem 414A can store data inputs, and/or data outputs of programs executing on processors of host procs 410, RT procs 436, and/or RPs 456.

Mem 414B can comprise a physical memory of runtime processor 430 and/or host 402, and/or a physical memory communicatively coupled to runtime processor 430 and/or host 402 (e.g., to host procs 410 and/or RT procs 436). Mem 414B can store instructions of programs executing on, for example, host procs 410, RT proc 436, and/or RPs 456. Mem 414B can store data inputs, and/or data outputs of programs executing on host procs 410, RT proc 436, and/or RPs 456. Mem 414B can comprise a region of mem 414A of host 402, a physical memory of host 402 alternative to mem 414A, and/or a physical memory communicatively coupled to host 402 (e.g., to host procs 410) and/or runtime processor 430 (e.g., to RT procs 436).

Mem 414C can comprise a physical memory of RDU 450 and/or can comprise a memory of a node (not shown in FIG. 4) of BPAS 400. Mem 414C can store instructions of programs executing on, for example, RPs 456. Mem 414C can store data inputs, and/or data outputs of programs executing on host procs 410, RT proc 436, and/or RPs 456. Mem 414C can comprise a region of mem 414A and/or mem 414B, a physical memory of host 402 and/or runtime processor 430 alternative to mem 414A and mem 414B, and/or a physical memory communicatively coupled to (e.g., to host procs 410), runtime processor 430 (e.g., to RT procs 436). and/or RDU 450.

In implementations, BPM 432 can allocate pipeline buffers in memories among memories 414. FIG. 4 illustrates pipeline buffers buffs 420A allocated in mem 414A, buffs 420B allocated in memory 414B, and buffs 420C allocated in memory 414C. In implementations, buffers among buffs 420A, 420B, and/or 420C (hereinafter, collectively, "buffs 420") can comprise, for example, batch (application data input) buffers, pre-process buffers, and/or computational buffers for pipelining data batching, pre-processing, and computational processing of application data. BPM 432 can allocate buffers among buffs 420 in a manner similar or equivalent, for example, to method 200 of FIG. 2.

As described with reference to the example of method 200, BPM 432 can utilize execution parameters, associated with executing a pipelined application, in determining buffers and/or memories, to allocate buffers among buffs 420. FIG. 4 depicts application execution parameters exec parms 422 comprising functions 424, buffers 426, and RDU parameters PROCS 428. In implementations, functions 424 can, for example, specify one or more particular processing operations and/or functions for BPAS 400 to perform on application data, such as application data in a data batch, and/or on particular data elements of a data batch (e.g., to perform on data of batch 404, and/or to perform on particular data elements among DEs 406). Functions 424 can specify to perform, for example, a matrix operation (e.g., a transpose or AllReduce) on the data of batch 404.

Functions 424 can include particular actions for a processor of BPAS 400 to take in association with processing a data batch, such as, for example, resuming a process (e.g., a process thread) of a program of batcher 416, BPM 432, PPP 446, and/or CPP 452 that may have been suspended pending processing of a data batch to a particular state, or pending results of processing the data batch. In another example, Functions 424 can include a program of batcher 416, BPM 432, PPP 446, and/or CPP 452, and/or a processor or hardware element of BPAS 400, communicating a status or result of processing the data batch to another such program or hardware element.

Buffers 426 can comprise buffer parameters describing buffers for BPM 432 to allocate, and/or processors of BPAS 400 to utilize, in processing application data, such as application data of batch 404. Buffer parameters included in buffers 426 can describe sizes and/or particular types of buffers (e.g., batch input, pre-process, and/or computational buffers). Buffer parameters included in buffers 426 can describe particular memories (e.g., memories among memories 414) in which to allocate buffers.

PROCS 428 can comprise processor parameters to specify and/or describe particular processors of BPAS 400—such as host procs 410, RT procs 436, and/or RPs 456—to execute stages of an application, such as a load stage, pre-process stage, and/or computation stage. PROCS 428 can specify or describe a processor of BPAS 400 to execute a particular stage, and/or operate on a particular data batch (and/or data element of a batch) in a particular stage. PROCs 428 can specify, for example, particular CPUs and/or RDUs/RPs, among processors of BPAS 400, to perform operations of APP 418.

BPM 432 can determine and manage pipeline buffers among buffs 420 based on parameters included in exec parms 422. BPM 432 can determine, for example, buffer sizes, a number of buffers, types of buffers, and/or particular memories in which to allocate buffers based on parameters include in exec parms 422. BPM 432 can manage availability of buffers to data batcher 416, PPP 446, and/or CPP 452 as these components process (e.g., input, pre-process, or computationally process) data in, or to input into, the buffers. BPM 432 can manage transfer of data among buffers in particular memories among memories 414. BPM 432 can manage transfer of data among the buffers, for example, to transfer data in a buffer of one memory, among memories 414, to a buffer of an alternative memory among memories 414 to facilitate access by a particular processor of BPAS 400 (e.g., a processor among host procs 410, RT procs 436, and/or RPs 456) to the data, and/or to facilitate higher performance access to the data by a particular processor of BPAS 400.

A BPAS, such as BPAS 400, can include an interface to enable components of the system to communicate. In FIG. 4, interface 448 can communicatively couple host 402 and RDU 450 such that, via interface 448, hardware and/or program components of host 402 and/or runtime processor 430 can communicate with hardware and/or program components of RDU 450, and vice versa. For example, via interface 448 programs of kernel 440, PPP 446, and/or BPM 432 can communicate with programs of CPP 452 and or other programs (not shown in FIG. 4) of RDU 450, such as programs to configure and/or manage hardware of RDU 450 (e.g., RPs 456 and/or ATL 408C). Via interface 448, BPM 432 can, for example, determine status of RDU 450 processing of data in buffers among buffs 420.

In implementations, interface 448 can comprise a communications interface (e.g., an I/O bus or link, or a network interface) and/or regions of memories among memories mem 414A, mem 414B, and/or mem 414C (such as to store/retrieve application execution parameters and/or application data). Interface 448 can comprise a programming interface (e.g., an API and/or CLI) of programs of RDU 450.

In BPAS, such as illustrated by BPAS 400, processors (and/or other hardware elements of a BPAS) executing programs of a data batcher, pre-processor, BPM, and/or computational functions of a pipelined application can access application data in pipeline buffers located in particular physical memories, which can include all or only some of the physical memories included in, or coupled to, the processors. In implementations, processors of a host (e.g., host procs 410), runtime processor (e.g., RT procs 436), and computational processor (e.g., RPS 456) can access memories of, or coupled to, BPAS 400 (e.g., memories 414) via an interface, such as a memory, fabric, or I/O interface.

In FIG. 4, host procs 410, RT procs 436, and RPs 456 are shown communicatively coupled to memories 414 via interfaces 462. Interfaces 462 can comprise a single interface (e.g., a single memory bus, network, or fabric) coupling all of host procs 410, RT procs 436, and RPs 456 to all of memories 414. Alternatively, interfaces 462 can comprise multiple interfaces, and the interfaces can be independent of some or all of the other interfaces or, alternatively, can be integrated amongst some or all of the other interfaces. Interface 462 can comprise interfaces that enable some processors among host procs 410, RT procs 436, and RPs 456 to access to only some, but not necessarily all, of memories among memories 414.

In implementations, processors among host procs 410, RT procs 436, and RPs 456 can access memories among memories 414 by presenting an address of a location in the memories on an interface among interfaces 462. The processors can address the memories using, for example, a VA or PA of a pipeline buffer among buffs 420. Address translation logic associated with each of mems 414A, 414B, and 414C can translate the VAs to PAs within a memory, or can bypass a PA presented on interfaces 462 directly to the memory.

FIG. 4 illustrates ATL 408A associated with mem 414A, ATL 408B associated with mem 414B, and ATL 408C associated with mem 414C. ATLs 408A, 408B, and/or 408C (hereinafter, collectively, "ATL 408") can comprise hardware elements of host 402 and/or RDU 450, and/or hardware elements of other components of BPAS 400 (not shown in FIG. 4), such as hardware registers and circuits of BPAS 400 not shown explicitly in FIG. ATL 408A can comprise, for example, ATL to translate VAs of data stored in mem 414A, as presented on interfaces 462, to physical locations (regions) of mem 414A, through an ATW. ATL 408B can comprise ATL to translate VAs of data stored in mem 414B, as presented on interfaces 462, to physical locations (regions) of mem 414B. ATL 408C can comprise ATL to translate VAs of data stored in mem 414C, as presented on interfaces 462, to physical locations (regions) of mem 414C. ATL among ATL 408 can be components of a single hardware element of BPAS 400 or, alternatively, can be components of different components of BPAS 400, such as illustrated in FIG. 4 as host 402 including ATL 408A, runtime processor 430 including ATL 408B, and RDU 450 including ATL 408C.

Programs of BPAS 400—such as programs of batcher 416, runtime processor 430, and/or RDU 450—can perform a memory access via interface 462 to access data in memories among memories 414, illustrated in FIG. 4 as accesses 464A, 464B, and 464C (collectively, "accesses 464"). ATLs 408A, 408B, and/or 408C can decode (e.g., via an ATW mapping a VA of a buffer to a PA of the buffer in a physical memory) an address of an access among accesses 464 and can steer the access to a corresponding physical memory among memories 414.

Programs of BPAS 400 can reference pipeline buffers among buffs 420 via VAs to provide a level of abstraction (and/or virtualization) of the buffers, BPM 432 can manage access to the buffers among programs of batcher 416, PPP 446, and/or CPP 452 by managing translations included in ATLs 408A, 408B, and/or 408C. For example, batcher 416, PPP 446, and CPP 452 can all have a particular virtual address (which can be the same, or can be different, among them) of a buffer among buffs 420. When accessing the buffer (e.g., a buffer to input or process DE 406A of batch 404), processors of BPAS 400 executing programs of batcher 416, PPP 446, and CPP 452 can reference the buffer using their particular VA for the buffer. The processors can present the VA on interface 462 and ATLs 408A, 408B, and/or 408C can decode the VA to steer the access to a corresponding physical memory among memories 414 containing (or, corresponding to) the buffer.

BPM 432 can modify translations (e.g., ATWs) of ATLs 408A, 408B, and 408B to direct particular accesses, via the VAs of buffers among buffs 420, to locations within memories among memories 414. For example, a batch buffer among buffs 420A can have a VA known to batcher 416 and batcher 416 can input data (e.g., a data element among DEs 406) to the batch buffer by reference to the VA of the buffer. An ATW translated by ATL 408A can direct the VA access to a corresponding PA in mem 414A to store the input data. Assuming the data in the batch buffer requires pre-processing, PPP 446 can know a pre-process VA of the buffer and can access the data in the buffer using the pre-process VA; an ATW translated by ATL 408B can direct the pre-process VA access to the PA of the buffer in mem 414A. Similarly, CPP 452 can know a computational VA of the buffer and can access the data in the buffer using the computational VA; an ATW translated by ATL 408C can direct the computational VA access to the PA of the buffer in mem 414A.

In an execution pipeline of BPAS 400 to execute APP 418, batcher 416 inputs data of batch 404 into buffers among buffs 420, PPP 446 pre-processes batch data input to the buffers, and CPP 452 performs computational processing of data in the buffers. BPM 432 can interact with batcher 416, PPP 446, and CPP 452 to hand buffers from one stage (e.g., batching) to another (e.g., pre-processing and/or computational processing) via translations in ATLs 408A, 408B, and/or 408C. As illustrated in operations 308, 314, and 320 of method 300 in FIG. 3A, BPM 432 can additionally, or alternatively, transfer data among buffers of buffs 420 to alternative memories among memories 414, and can update translations used by (e.g., ATWs translated by) ATLs 408A, 408B, and/or 408C to direct VA accesses to locations in the alternative memory of memories 414.

In implementations, a BPAS, such as the example of BPAS 400 in FIG. 4, can comprise a component of, or can be communicatively coupled to, a virtualized and/or cloud computing system. For example, components of BPAS 400 in the example of FIG. 4, can comprise virtual representations of BPAS 400 and/or components of BPAS 400 (e.g., virtual host systems and/or virtual RDUs or RPs). Physical resources of a BPAS, such as host, runtime, and/or RDU processors, and/or memories of a BPAS, can be virtual resources of a virtual machine and/or cloud computing environment. A pipelined application, and/or operations thereof (e.g., data batching, pre-processing, and/or computational processing) can execute as programs of a virtual machine utilizing the virtual representations of BPAS 400 and/or components of BPAS 400.

Figure 5:
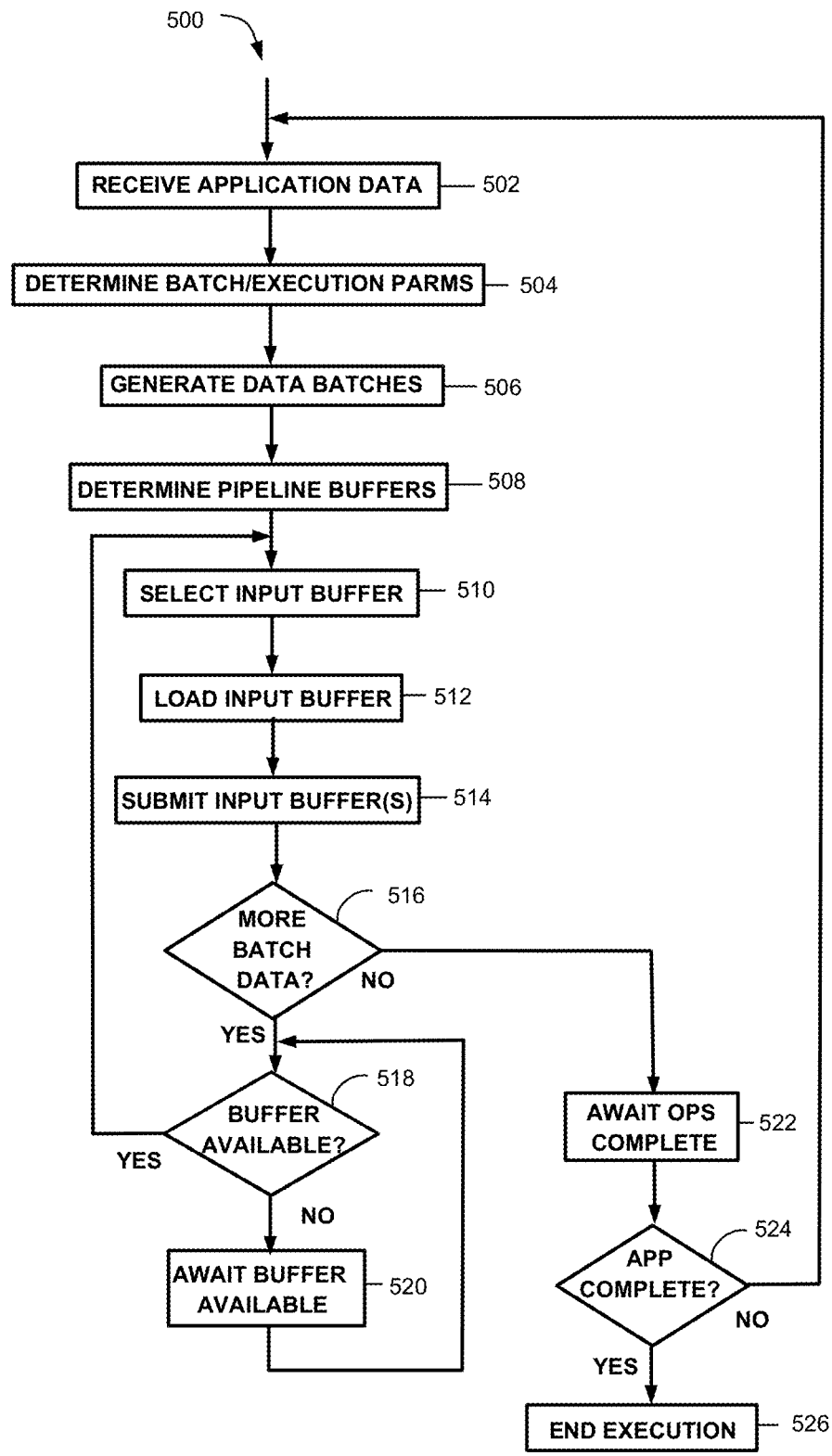
FIG. 5 illustrates an example method of an application execution program pipelining execution of stages of a computing application using pipeline buffers, according to aspects of the disclosure.

FIG. 5 illustrates example method 500 for an AEP to manage execution of execution stages of a pipelined application using pipelined buffers. For purposes only of illustrating the method of FIG. 5, but not intended to limit implementations, the method is described as performed by an AEP utilizing resources of a host computing system of a BPAS to execute stages of a pipelined application comprising batching, optional pre-processing, and computational processing of application data. The host system can be, for example, a host such as host 402 in the example of BPAS 400 in FIG. 4, The method is further described as the AEP interacting with a BPM, such as in the examples of FIGS. 1-4, via a PPI of the BPM, to execute stages of the application on compute resources of a BPAS, such as nodes and/or RDUs, or components thereof, of a BPAS as illustrated by BPAS 400 in FIG. 4. However, it would be appreciated by one of ordinary skill in the art that the method, and/or similar or equivalent methods, can be performed by components of a computing system other than an AEP and/or components of a BPAS such as illustrated in the example of FIG. 4.

In the method, the AEP can interact with the BPAS to pipeline application stages using a PPI of a BPAS, such as illustrated by the example of BPAS 400 in FIG. 4 and example methods of the disclosure. Using the PPI, and/or other APIs of the BPAS, the AEP can receive, or can determine buffer parameters to allocate pipeline buffers; can determine particular memories in which to allocate buffers; can batch data of the application; can determine particular buffers to buffer particular data batches; can determine when to input data batches into the buffers for BPAS processing; can determine to transfer, or to initiate transfer, of batch data among buffers in differing physical memories of the BPAS; can determine to reuse buffers to input and/or process other data batches; and/or can determine when to execute operations of the application on data batches stored in the buffers.

Turning to operations of example method 500, in operation 502 of method 500, the AEP receives application data for processing. In operation 502, the AEP can receive a portion of the data, and/or can receive all of the data. The AEP can receive the application data in a memory, and/or can receive the data via a communications interface, such as a network interface. The AEP can receive the data via an API (e.g., a host processor or runtime processor API) of the BPAS and/or AEP, and/or via a host computing system on which the AEP can execute. In some implementations, the AEP can receive the data in a pipeline buffer allocated (e.g., a pre-allocated buffer) in a memory of the BPAS, such as a host memory, runtime processor memory, and/or a memory of an RDU of the BPAS (e.g., a memory of a CP of an RDU).

In operation 504 the AEP determines and/or receives data batching parameters associated with batching the application data and/or execution parameters associated with the application execution stages and/or stage processors. Data batching parameters can comprise, for example, types of application data and/or particular processing operations to perform on the application data, preferred sizes of data elements of data batches, preferred sizes of data batches, a number of data batches to generate, and/or particular batch data among the application data. Execution parameters can comprise, for example, execution parameters such as previously described in reference to operation 202 of method 200 in FIG. 2. The AEP can determine or receive execution parameters associated with the application data and/or executing stages of the application.

In operation 504 the AEP can determine execution and/or data batching parameters based, for example, on the size and/or number of batches to generate, on the nature of processing the batches (e.g., the nature of computational processing of the batches and/or whether the batches may require pre-processing), and/or based on resources available or allocated to process the batches, or to process particular batches. The AEP can determine execution and/or data batching parameters based, for example, on host, runtime, and/or RDU/CP memories available, or required, to process the batches (or, to process particular batches), and/or resource attributes of those memories and/or processors utilizing those memories. Alternatively, or additionally, in operation 504, the AEP can determine some or all of the data batches based on execution/batch parameters (e.g., buffer parameters included in execution parameters) received or determined in operation 504.

The AEP can receive some or all of the execution parameters as outputs (e.g., data files or API outputs) of a component of the BPAS, such as outputs of a compiler of the BPAS, and/or outputs of a runtime configuration component, or runtime kernel, of the BPAS. The AEP can determine, in operation 504, execution and/or data batching parameters based on outputs of a compiler of the application, and/or of execution stages of the application, and/or based on an output of a configuration component (e.g., a runtime configuration component) of the BPAS.

The AEP can invoke APIs of the BPAS, such as an API of a runtime processor or a PPI of the BPAS, to determine and/or receive execution parameters in operation 504. For example, a PPI can include APIs to query available resources, query execution and/or other attributes of available resources, query processing capabilities of available resources, to query execution parameters output from components of the BPAS, and so forth.

In operation 506 the AEP generates batches of data comprising portions of the application data. The AEP can generate the batches based on execution and/or data batching parameters The AEP can select the size and/or number of batches to correspond, for example, to compute (e.g., CP) and/or memory (BPAS and/or RDU memory) resources available and/or allocated to execute the application, or to execute stages of the application. Additionally, or alternatively, the AEP can select the size and/or number of batches based on the compute requirements of the application and/or BPAS to process the data, nature of the application and/or stages of the application, and so forth.

In operation 508, the AEP determines a set of pipeline buffers to buffer data batches for input to BPAS processing elements and/or to pipeline execution of application stages.

The AEP can determine the buffers based on buffer parameters, and/or other execution parameters, associated with an execution stage of the application, for example. The buffers can be buffers allocated by a compiler, and/or a runtime component, of a BPAS and, in operation 508, the AEP can determine a set of pipeline buffers based on an output of a compiler, or by invoking a buffer query interface of an API of the BPAS to determine a set of pipeline buffers. Determining pipeline buffers, in operation 508, can include determining memory parameters (e.g., type of memory, a virtual and/or real address of a memory, and/or resource attributes of a memory) containing the buffers.

Alternatively, or additionally, in operation 508 determining a set of pipeline buffers can be a result of the AEP requesting the BPAS (e.g., a runtime processor or BPM of the BPAS) to allocate pipeline buffers. In operation 508, the AEP can request allocation of the buffers via, for example, an API (e.g., a runtime API, and/or PPI, of the BPAS) to allocate pipeline buffers. In operation 508 the AEP can, for example, invoke an API of a PPI of the BPAS, such as the ALLOCATE(BUFFERS) API of PI 444B in FIG. 4, to request allocation of the buffers.

The AEP can, in operation 508, output to components of the BPAS (e.g., to a BPM) execution parameters determined and/or received in operation 504 to determine or allocate the buffers. The AEP can output the execution parameters via an API of the BPAS, such as a runtime API, and/or PPI, of the BPAS. In operation 508 the AEP can additionally, or alternatively, receive from the BPAS (e.g., from a runtime processor or BPM) parameters describing pipeline buffers allocated in operation 508. As previously described in reference to method 200 of FIG. 2, the buffer parameters can include sizes of buffers, types of memories containing the buffers, numbers of buffers, and types (e.g., batch, pre-process, and/or computational) of the buffers.

In operation 508, the AEP can request the BPAS to allocate particular buffers in particular memories of the BPAS. For example, the AEP can determine that particular data batches, and/or particular types of processing of data batches, can be advantageously performed with the data batch(es) located in particular memories of the BPAS, such as a host memory versus an RDU memory. Accordingly, the AEP can request the BPAS to allocate buffers for those data batches in those particular memories. In operation 508, the AEP can determine particular memories in which to allocate buffers based on resource attributes of memories and/or processing elements of the BPAS to execute particular stages of the application. The AEP can determine resource attributes via an API of the BPAS, such as a host processor API, runtime API and/or PPI, of the BPAS, and/or from attributes included information provided to the AEP by compiler and/or runtime components of the BPAS.

Additionally, or alternatively, in operation 508 the AEP can use an interface of an API of the BPAS, and/or of the PPI, to directly allocate, or otherwise assign, a region of physical memory of the BPAS to one or more pipeline buffers. As previously described n AEP can determine to allocate buffers in a particular physical memory of the BPAS based on, for example, resource attributes of memories and/or processing elements of the BPAS.

In operation 510 the AEP selects one or more input buffers in which to load batch data for processing by the BPAS. The AEP can use an API of the BPAS (e.g., an API of a runtime processor and/or PPI) to select the buffer, such as the GETBUFF( ) interface of PPI 444B in FIG. 4. The AEP can select one or more buffers based on information returned from an interface such as GETBUFF( ), and/or based on BPAS and/or buffer parameters included in execution parameters determined or received in operation 508.

In operation 510 the AEP can select the buffer based, for example, on execution parameters, or resource attributes, such as previously described. For example, in operation 510 the AEP can select the buffer based on a particular memory containing the buffer, and/or the type of processing to perform on a data batch (e.g., simply inputting batch data, pre-processing the data, and/or computational processing the data). In operation 510 the AEP can select the buffer based on performance, capacity, and/or topological attributes of memories containing the buffers. An input buffer need not, in implementations, be limited to only input of batch data to the BPAS for processing. As previously describe, an input buffer can additionally serve as a pre-process buffer and/or a computational buffer. Accordingly, in operation 510 the AEP can select an input buffer based on that buffer able or, alternatively, not able, to serve as a pre-process buffer and/or a computational buffer.

In operation 512, the AEP loads data of a data batch (or, batches) into an input buffer (or, buffers) selected in operation 510. In operation 512 the AEP can input the data via various data transfer mechanisms, such as memory copy, direct memory access (DMA), remote DMA (e.g., DMA via a network or interconnection fabric). The AEP can invoke an interface of an API/PPI of the BPAS, such as the LOAD( ) interface of PPI 444B in FIG. 4, to input the data batch(es).

The AEP can determine, in 512, to load data batches into buffers determined in 508 based on, for example, an execution status associated with the BPAS executing the application. The AEP can use the PPI and/or other APIs of the BPAS, for example, to determine an execution status. In implementations an execution status can comprise, for example, a status of buffer among the pipeline buffers; a status of an execution stage of an application; a status of BPAS processing resources; and/or, a BPAS processing status. A status of buffers can comprise, for example, that buffers are available to load or process and/or that buffers are partially or completely filled with batch data. A status of an execution stage can include, for example, that processing operations of that stage are not yet initiated, are in progress (but, incomplete), are suspended, or are complete. A status of BPAS processing resources can be associated with hardware resources of the BPAS and can comprise, for example, particular BPAS hardware resources (e.g., physical memories, processors, and/or interconnection interfaces) are or, alternatively, are not available or allocated to execute a particular execution stage, or particular operations of a particular execution stage of the application; and/or an attribute of data included in the buffers.

A BPAS processing status can be associated with data batches previously input to, and/or processed by, the BPAS. For example, that a buffer, or a group of buffers, is being processed by a particular processor of the BPAS (e.g., a pre-processor or CP); that a buffer, or a group of buffers, has completed processing by the BPAS, or by a particular processor of the BPAS; that batch data included in a buffer, or a group of buffers, is pending transfer to another buffer, or another physical memory; that a buffer, or a group of buffers, is pending updates to an ATW to access data in the buffer(s); and/or that the BPAS has suspended processing of a buffer, or a group of buffers (e.g., to await results of BPAS processing of other buffers). A BPAS processing status can include that particular hardware resources of the BPAS to process one or more buffers is or, alternatively, is not available at a particular time to process data in the buffer(s).

Based on such an execution status, the AEP can determine, in operation 512, that the BPAS has completely processed a data batch in a particular buffer, and/or that the BPAS has transferred that data batch to another buffer in another memory, such that the AEP can, in operation 512, input another data batch in that buffer. In another example, the AEP can determine, in operation 512, to input additional data batches to the BPAS based on additional buffers being available to the AEP to input the additional data batches.

In a further example, the AEP can determine, in operation 512, to input additional data batches to the BPAS in based on the BPAS (e.g., a pre-processor and/or CP of the BPAS) having resources (e.g., RDUs and/or CPs) available to process the additional data batches. Alternatively, in operation 512, the AEP can determine to suspend, or defer, inputting additional data batches to the BPAS in based on the BPAS (e.g., a pre-processor and/or CP of the BPAS) not having resources available to process the additional data batches, that a data batch in a particular input buffer is pending processing or transfer to another buffer in a different physical memory of the BPAS, and/or that a buffer is pending ATW mapping (and/or memory pinning) by the BPAS.

In operation 514 the AEP submits one or more input buffers, having batch data stored in the buffer(s), to the BPAS for processing. The AEP can submit (or, alternatively, can suspend submitting) the buffers to the BPAS based on an execution status, such as described with reference to operation 512. As also described with reference to operation 512, the AEP can use an interface of the PPI and/or another API of the BPAS to determine an execution status.

In operation 514 the AEP can use an interface of an API or PPI of the BPAS, such as the RUN( ) interface of PPI 444B of FIG. 4, to submit buffers to the BPAS for processing. An interface of an API/PPI of the BPAS can, for example, input one or more input buffers selected in operation 510 to the BPAS (e.g., to a runtime processor, or BPM, of the BPAS) for execution and can initiate BPAS processing, such as pre-processing and/or computational processing, of a data batch included in the buffer. An interface of an API/PPI of the BPAS can, for example, enqueue one or more input buffers selected in operation 510 to the BPAS (e.g., to a runtime processor, or BPM, of the BPAS) for execution according to availability of BPAS processing resources.

The AEP can organize a set of buffers as a group, such as previously described. The AEP can organize buffers within a group based, for example, on the type of processing to perform on data batches in the group (e.g., data type or memory order conversion by a pre-processor, or a particular execution stage computation, such as computations of an AllReduce algorithm of a machine learning application). In another example, the AEP can organize a set of buffers as a group based on the BPAS hardware resources, and/or types of BPAS hardware resources, available or allocated to process data in the buffers. The AEP can organize a set of buffers as a group based on execution parameters of an execution stage to process the buffers.

In operation 512 the AEP can load data batches into respective buffers of the group, and/or in operation 514 the AEP can submit some or all of the buffers within a group to the BPAS for processing. For example, as illustrated by PPI 444B in FIG. 4, a LOAD( ) and/or RUN( ) interface of a PPI can include a group ID (GID) to identify a group of buffers to the BPAS for processing and in operations 512 and/or 514 the AEP can identify the buffers based on a GID.

In operation 516 the AEP determines if there is additional application data to generate as data batches, or additional application data to generate as data batches at a particular point in the execution of one or more application execution stages. The AEP can determine that there is additional data to generate as a data batch based on application data received in operation 502, and/or based on results of processing prior data batches. In the latter case, the AEP can, for example, receive (e.g., in operation 502 or operation 516) results of processing a prior data batch, such as a result of GeMM computation using that data batch, and can input that result as a data batch for the BPAS to process in a computation of the same execution stage or, alternatively, of a different execution stage, of the application.

If, in operation 516 the AEP determines there is not additional data (application data and/or results data, for example) to generate new data batches, in operation 522 the AEP can await completion of processing of data batches input to the BPAS in operation 514. In operation 524, based on completion of BPAS processing of one or more data batches, and/or completion of one or more application execution stages, the AEP can determine executing the application, or executing particular stages of the application is complete. The AEP can determine, in operation 524, if executing the application, or executing particular stages of the application is complete based, for example, on an execution status of data batches included in one or more input buffers submitted to the BPAS in operation 514. The AEP can determine the execution status using, for example, an interface of an API (e.g., a runtime API) or PPI of the BPAS.

If, in operation 524 the AEP determines that executing the application, or executing particular stages of the application is complete, in operation 526 the AEP ends execution of the application or application stages. In operation 526, ending execution of the application or application stages can comprise the AEP outputting results of the application, and/or results of application stages, such as to a data base, a user of the application (e.g., a user of the BPAS and/or a client of a cloud utilizing the BPAS), and/or to other application execution stages or processes. Ending execution of the application or application stages can comprise the BPAS de-allocating BPAS processing resources allocated to executing the application. Ending execution of the application or application stages can comprise the BPAS making pipeline buffers determined in operation 508 available to execute other applications, or to execute additional application execution stages of the application, or can comprise the BPAS de-allocating resources associates with pipeline buffers determined in operation 508 (e.g., removing or remapping ATWs, de-allocating ATL resources associated with ATWs of the buffers, and/or unpinning BPAS memory associated with the buffers).

If, in operation 524 the AEP determines that executing the application, or executing particular stages of the application is not complete (e.g., at least one execution stage, or processing of at least one data batch, of the application is incomplete), the BPAS can repeat operations 502-514.

Returning to operation 516, if the AEP determines in operation 516 that there is additional application data, and/or processing results, to generate additional data batches, in operation 518 the AEP determines if there are input data buffers available in which to store additional data batches. In operation 518 the AEP can determine if there are input data buffers available in which to store additional data batches based on a status of input buffers, and/or an execution status of an execution stage of the application. The AEP can, for example, maintain count, and/or a queue, of input buffers and can determine, in operation 518, if there are available input buffers based on the count or queue. In another example, the AEP can invoke an interface of the BPAS, and/or the PPI, to determine an execution stage of the application and/or a status associated with buffers processed in an execution stage of the application.

If the AEP determines, in operation 518, that there are input buffers available to store additional data batches, the AEP can repeat operations 502-524. If the AEP determines in operation 518 that there are not available input buffers, in operation 520 the AEP can await availability of one or more input buffers or can take an action to make additional buffers available. In operation 520 the AEP can await completion of processing, and corresponding availability of an input buffer for reuse (e.g., as a result of the BPAS returning a buffer to an available pool of buffers, such as described in operation 338 of FIG. 3B) and can repeat operation 518 to determine if, and/or when, an input buffer is available.

In operation 520, based on there being no input buffers available, the AEP can take an action, such as to repeat operation 508 to determine (e.g., request allocation of, or get information on) additional pipeline buffers. The AEP can, in operation 520, take an action such as to initiate transfer of data among buffers to make a buffer available for additional batch data. The AEP can initiate transfer, for example, of batch data from an input buffer in one memory (e.g., a host memory, runtime memory, or RDU memory) to a buffer in the same or another memory (e.g., another host, runtime, or RDU memory). The AEP can initiate remapping (modifying an ATW, for example) a pipeline buffer, such as illustrated in the example of method 330 of FIG. 3B, to make a buffer available. The AEP can, in operation 520, invoke an interface of the BPAS and/or PPI to request the BPM to initiate transfer of data from one buffer to another, and/or to initiate remapping of a buffer. In operation 520 the AEP can await completion of the transfer or remapping, and can repeat operation 518 to determine that a buffer is (or has become)

available. Upon determining (e.g., in repeating operation 518) that one or more additional buffers becoming available, in operation 520, the AEP can repeat operations 502-524.

Alternatively, or additionally, in operation 518, the AEP can determine that there are input buffers available to store additional data batches but that, based on an execution status of one or more other pipeline buffers, the AEP can, or should, suspend generating and/or inputting data batches pending a change in that, or another, execution status (e.g., a memory, CP, DMA engine, ATW, or other processing resource of the BPAS becoming available to process new data batches input in the AEP repeating operation 514 with data batches in available input buffers). The AEP can, in operation 520, await a change in execution status and, based on the change in execution status, can resume generating/inputting data batches and can repeat operation 518 to determine if there are additional buffers available to input more data batches.

From the example of method 500, it can be seen that using an API/PPI of a BPAS, an AEP can interact with the BPAS (e.g., a runtime processor and/or BPM of the BPAS) to manage pipeline execution of data batches, such as generating data batches, loading input buffers, and submitting input buffers for processing by a BPAS. As can be seen from method 500, the AEP can, for example, manage a rate or number of data batches input to the BPAS. The AEP can interact with the BPAS (or, BPM) to reuse pipeline buffers and/or direct placement of buffers (e.g., batch data in buffers) in particular memories of the BPAS (e.g., a host memory versus an RDU or CP memory). In contrast, computing systems lacking pipeline buffers and/or BPAS capabilities/APIs/PPIs, an AEP (and/or, an application) can be prevented from such interaction, such that the AEP can only submit the entire application for processing by the BPAS, and performance of application processing can be limited due to inefficiencies resulting from a lack of AEP/BPAS interaction.

Embodiments can comprise a computer program product and can include a computer readable storage medium (or media) having computer readable program instructions of the computer program product incorporated therein. One of ordinary skill in the art will appreciate that computer readable program instructions can implement each or any combination of operations and/or structure of the disclosure, such as illustrated by the drawings and described herein.

The computer readable program instructions can be provided to one or more processors, and/or other elements, of a computing system or apparatus to produce a machine which can execute, via the processor(s), to implement operations and/or actions similar or equivalent to those of the disclosure. The computer readable program instructions can be stored in a computer readable storage medium that can direct one or more processors, and/or other elements, of a computing system or apparatus to function in a particular manner, such that the computer readable storage medium comprises an article of manufacture including instructions to implement operations and/or structures similar or equivalent to those of the disclosure.

The computer readable program instructions of the computer program product can cause one or more processors to perform operations of the disclosure. A sequence of program instructions, and/or an assembly of one or more interrelated programming modules, of the computer program product can direct one or more one or more processors and/or computing elements of a computing system to implement the elements and/or operations of the disclosure including, but not limited to, the structures and operations illustrated and/or described in the present disclosure.

A computer readable storage medium can comprise any tangible (e.g., hardware) device, or combination of tangible devices, that can store instructions of the computer program product and that can be read by a computing element to download the instructions for use by a processor. A computer readable storage medium can comprise, but is not limited to, electronic, magnetic, optical, electromagnetic, and/or semiconductor storage devices, or any combination of these. A computer readable storage medium can comprise a portable storage medium, such as a magnetic disk/diskette, optical disk (CD or DVD); a volatile and/or non-volatile memory; a memory stick, a mechanically encoded device, and any combination of these. A computer readable storage medium, as used herein, is not to be construed as being transitory signals per se, such as electrical signals transmitted through a wire, radio waves or other freely propagating electromagnetic waves, or electromagnetic waves propagating through a wave transmission medium (e.g., a wave guide or fiber-optic cable).

The computer readable program instructions can be communicated from the computer readable storage medium to the one or more computing/processing devices, via a programming API of a computing system, and/or a communications interface of a computing system, having access to the computer readable storage medium, and/or a programming API of a computing system, and/or a communications interface of the one or more computing/processing devices. The API(s) and/or communications interface(s) can couple communicatively and/or operatively to a network, such as the Internet, a local area network, a wide area network, and/or a wireless network. The API(s) and/or communications interface(s) can receive the computer readable program instructions read from computer readable storage medium and can forward the computer readable program instructions to the one or more computing/processing devices via the API(s), communications interface(s), and/or network.

In implementations, the computer readable program instructions of the computer program product can comprise machine language and/or assembly language instructions, instruction-set-architecture (ISA) instructions, microcode and/or firmware instructions, state-setting data, configuration data for integrated circuitry, source code, and/or object code. The instructions and/or data can be written in any combination of one or more programming languages.

The computer readable program instructions can execute entirely, or in part, on a user's computer, as a stand-alone software package; partly on a user's computer and partly on a remote computer; or, entirely on a remote computer. A remote computer can be connected to a user's computer through any type of network, including a local area network (LAN) or a wide area network (WAN). In implementations, electronic circuitry including, for example, FPGA, PLAs, and or CGRAs can execute the computer readable program instructions by utilizing state information of the computer readable program instructions to configure the electronic circuitry to perform operations or elements of the disclosure, such as illustrated by the drawings and described herein.

In implementations, computer readable program instructions can also be loaded onto a computing system, or component(s) thereof, to cause the computing system and/or component(s) thereof to perform a series of operational steps to produce a computer implemented process, such that the instructions which execute on the computing system, or component(s) thereof, implement the operations or elements of the disclosure, such as illustrated by the drawings and described herein.

The flowchart and block diagrams in the Drawings and Incorporations illustrate the architecture, functionality, and operation of possible implementations of systems, methods, and computer program products according to various implementations of the present invention. Individual elements illustrated in the Figures—such as individual operations illustrated in the flowcharts or individual blocks of block diagrams—may represent a module, segment, or portion of executable instructions for implementing the disclosed function(s). In various alternative implementations, particular operations may occur in an order differing from that illustrated in the examples of the drawings. For example, two operations shown in succession in a diagram of the disclosure may, in a particular implementation, be executed substantially concurrently, or may sometimes be executed in a reverse order, depending upon the functionality involved. It will be further noted that particular blocks of the block diagrams, operations of the flowchart illustrations, and/or combinations of blocks in the block diagrams and/or flowchart illustrations, can be implemented using special purpose hardware and/or systems that, individually or in combination, perform the specified functions, acts, and/or computer instructions.

Terminology used herein, and the examples disclosed, are chosen to illustrate the principles of the implementations, the practical application or technical improvement over alternative technologies, and to enable others of ordinary skill in the art to understand the implementations disclosed herein. The disclosure illustrates various example implementations, and the examples are intended to illustrate principles and aspects of the disclosure, but are not intended to limit implementations, nor intended to be exhaustive of implementations that may be conceived within the scope of the disclosure. It would be appreciated by one of ordinary skill in the art that alternative implementations can comprise modifications and combinations within the spirit of the disclosure and the scope of the claims.

As can be seen in the foregoing examples, features of the disclosure can comprise methods and apparati of computing systems. A summary of example implementations of such features includes:

Example Implementation 1

A computer-implemented method comprises: allocating, by a Buffer-Pipeline Manager (BPM), responsive to a first interface of a Pipeline Programming Interface (PPI) of a Buffer Pipelined Application computing System (BPAS), based on execution parameters associated with the BPAS executing a pipelined application, a plurality of pipeline buffers, the BPM included in the BPAS, the pipelined application comprising a plurality of application execution stages, the BPAS comprising a plurality of stage processors to execute corresponding execution stages among plurality of application execution stages, the plurality of pipeline buffers included in at least one physical memory of the BPAS.

The method includes configuring, by the BPM, access to a first buffer, among the plurality of pipeline buffers, by a first stage processor among the plurality of stage processors, the first buffer included in a first region of a first physical memory, the first physical memory among the at least one physical memory of the BPAS, the first stage processor to execute a first execution stage, among the plurality of application execution stages of the pipelined application, utilizing the first buffer; and, initiating, by the BPM, responsive to the configuring the access to the first buffer by the first stage processor, operations of the first stage processor utilizing the first buffer.

The method further includes determining, by the BPM, a first buffer ready status associated with a processing operation of the first stage processor on data included in the first buffer, the first data ready status corresponding to second stage input data ready for processing by a second stage processor, the second stage input data comprising data output by an operation of the first stage processor, the second stage processor to execute a second execution stage, among the plurality of application execution stages, to process the second stage input data; transferring, by the BPM in response to the first buffer ready status, the first buffer to the second stage processor for processing, by the second stage processor, the second stage input data; and, configuring, by the BPM, responsive to the transferring the first buffer, access by the second stage processor to a second buffer among the plurality of pipeline buffers, the second buffer including the second stage input data, the second buffer included in a second region of a second physical memory, the second memory among the at least one physical memory of the BPAS.

Example Implementation 2

The method of implementation 1, wherein the first region of the first memory is different from the second region of the second memory, and wherein the method the BPM transferring the first buffer to the second stage processor comprises: determining, by the BPM, based on the first region of the first memory different from the second region of the second memory, and based further on a memory access attribute of at least one of the first and second physical memories, to transfer the second stage input data from the first region of the first physical memory to the second region of a second physical memory of the BPAS; and, initiating, by the BPM, responsive to the determining to transfer the second stage input data from the first region of the first physical memory to the second region of the second physical memory, a transfer of the second stage input data from the first region of the first physical memory to the second region of the second physical memory.

Example Implementation 3

The method of implementation 2, wherein the method further comprises determining, by the BPM, responsive to the BPM initiating the transfer of the second stage input data, a completion status of the transfer; and, communicating, by the BPM, to the first stage processor, responsive to the determining the completion status of the transfer, that the first buffer is available for reuse by the first stage processor.

Example Implementation 4

The method of implementation 1, the method further comprising initiating, by the BPM, responsive to the configuring the access to the second buffer by the second stage processor, operations of the second stage processor on the second stage input data.

Example Implementation 5

The method of implementation 1, wherein at least one of the method the BPM configuring the access to the first buffer and the method the BPM configuring the access to the second buffer comprises the BPM modifying address translation logic of the BPAS to translate a virtual address (VA) of at least one of the first and second buffers to a physical address (PA) of the at least one of the first and the second buffers in the respective first and second physical memories.

Example Implementation 6

The method of implementation 1, wherein the method the BPM allocating the plurality of pipeline buffers comprises determining, by the BPM, based on execution parameters associated with executing the pipelined application, the first region of the first physical memory to include the first buffer and the second region of a second physical memory to include the second buffer.

Example Implementation 7

The method of implementation 1, wherein the method the BPM allocating the plurality of pipeline buffers comprises the BPM modifying address translation logic of the BPAS to translate a virtual address of a buffer, among the plurality of pipeline buffers, to a physical address of a region of a physical memory among the at least one physical memory.

Example Implementation 8

The method of implementation 1, wherein the method the BPM allocating the plurality of pipeline buffers comprises the BPM allocating buffers, among the pipeline buffers, using pre-allocated buffers associated with the BPAS executing the pipelined application.

Example Implementation 9

The method of implementation 8, wherein the method the BPM determining the first region of the first physical memory to include the first buffer and the method the BPM determining the second region of the second physical memory to include the second buffer comprises the BPM determining the first region and the second region based on the pre-allocated buffers.

Example Implementation 10

The method of implementation 1, wherein the second stage input data comprises data output by the processing operation of the first stage processor.

Example Implementation 11

The method of implementation 1, wherein the first stage processor comprises a stage processor selected from a group consisting of a data batcher associated with the pipelined application, a pre-processor of the BPAS and a computational processor of the BPAS; and, wherein the first execution stage is selected from a group comprising a data batching stage, a pre-processing stage, and a computational processing stage.

Example Implementation 12

The method of implementation 1, wherein the PPI comprises an interface selected from a group comprising an ALLOCATE BUFFERS interface, a GET BUFFER PARMS interface, a LOAD interface, and a RUN interface; wherein the method the BPM allocating the plurality of pipeline buffers comprises the BPM allocating the plurality of pipeline buffers responsive to the ALLOCATE BUFFERS interface; wherein the GET BUFFER PARMS interface of the PPI comprises at least one of a first and a second return argument, the first return argument specifying a buffer, among the plurality of pipeline buffers, for use by an execution stage processor among the plurality of stage processors, the second return argument comprising a parameter of a buffer among the plurality of pipeline buffers; wherein the method the BPM determining the first buffer ready status comprises the BPM determining the first buffer ready status responsive to the LOAD interface; and, wherein the method the BPM initiating the operations of the first stage processor comprises the BPM initiating the operations of the first stage processor responsive to the RUN interface.

Example Implementation 13

A computing system can comprise a Buffer Pipelined Application computing System (BPAS). The BPAS can comprise:

at least one hardware processor; at least one physical memory; a first stage processor configured to execute, utilizing a first hardware processor among the at least one hardware processor, a first execution stage among a plurality of application execution stages of a data parallel (DP) application; a second stage processor configured to execute, utilizing a second hardware processor among the at least one hardware processor, a second execution stage among the plurality of application execution stages; an application execution program (AEP) configured to execute, utilizing a third processor among the at least one hardware processor, operations to manage execution of the pipelined application by the system; a Pipeline Programming Interface (PPI); and, a Buffer-Pipeline Manager (BPM).

The BPM can be configured to: allocate, responsive to a first interface of the PPI, based on execution parameters associated with the system executing the pipelined application, a plurality of pipeline buffers, the plurality of pipeline buffers included in memories among the at least one physical memory; configure access to a first buffer, among the plurality of pipeline buffers, by the first stage processor, the first buffer included in a first region of a first physical memory, the first physical memory among the at least one physical memory of the BPAS, the first stage processor further configured to execute the first execution stage utilizing the first buffer; and, initiate, responsive to the configuring the access to the first buffer by the first stage processor, operations of the first stage processor utilizing the first buffer.

The BPM can be further configured to: determine a first buffer ready status associated with a processing operation of the first stage processor on data included in the first buffer, the first data ready status corresponding to second stage input data ready for processing by the second stage processor, the second stage input data comprising data output by an operation of the first stage processor, the second stage processor further configured to execute the second execution stage to process the second stage input data; transfer, in response to the first buffer ready status, the first buffer to the second stage processor for processing, by the second stage processor, the second stage input data; and, configure, responsive to the transferring the first buffer, access by the second stage processor to a second buffer among the plurality of pipeline buffers, the second buffer including the second stage input data, the second buffer included in a second region of a second physical memory, the second memory among the at least one physical memory of the BPAS.

Example Implementation 14

The system of implementation 13, wherein the first region of the first memory is different than the second region of the second memory. The BPM configured to transfer the first buffer to the second stage processor comprises the BPM further configured to determine, based on the first region of the first memory different from the second region of the second memory, and based further on based on a memory access attribute of at least one of the first and second physical memories, to transfer the second stage input data from the first region of the first physical memory to the second region of a second physical memory of the BPAS, the memory access attribute selected from a group consisting of: a distance of a first hardware processor to the memory, a bandwidth of the memory, an access latency of the memory, and access to the memory by the first hardware processor.

The BPM can be further configured to initiate, responsive to the determining to transfer the second stage input data from the first region of the first physical memory to the second region of the second physical memory, a transfer of the second stage input data from the first region of the first physical memory to the second region of the second physical memory a transfer of the second stage input data from the first region of the first physical memory to the second region of the second physical memory.

Example Implementation 15

The system of implementation 14, wherein the BPM is further configured to determine, responsive to the BPM initiating the transfer of the second stage input data, a completion status of the transfer; and, communicate, to the first stage processor, responsive to the determining the completion status of the transfer, that the first buffer is available for reuse by the first stage processor.

Example Implementation 16

The system of implementation 13, wherein the BPM is further configured to initiate, responsive to the BPM configuring the access to the second buffer by the second stage processor, operations of the second stage processor on the second stage input data.

Example Implementation 17

The system of implementation 13, wherein the system further comprises address translation logic; and, wherein at least one of the BPM configured to configure the access to the first buffer and the BPM configured to configure the access to the second buffer comprises the BPM further configured to modify the address translation logic to translate a virtual address of at least one of the first and second buffers to a corresponding physical address of the at least one of the first and second buffers in the at least one physical memory.

Example Implementation 18

The system of implementation 13, wherein the BPM configured to allocate the plurality of pipeline buffers comprises the BPM further configured to determine the first region of the first physical memory to include the first buffer and the second region of a second physical memory to include the second buffer based on execution parameters associated with the system executing the pipelined application.

Example Implementation 19

The system of implementation 13, wherein the system further comprises address translation logic; and, wherein the BPM configured to allocate the plurality of pipeline buffers comprises the BPM further configured to modify the address translation logic to translate a virtual address of a buffer, among the plurality of pipeline buffers, to a physical address of a region of a physical memory among the at least one physical memory.

Example Implementation 20

The system of implementation 13, wherein the BPM configured to allocate the plurality of pipeline buffers comprises the BPM further configured to allocate buffers, among the pipeline buffers, using pre-allocated buffers associated with the system executing the pipelined application.

Example Implementation 21

The system of implementation 20, wherein the BPM configured to determine the first region of the first physical memory to include the first buffer and the BPM configured to determine the second region of the second physical memory to include the second buffer comprises the BPM further configured to determine the first region and the second region based on the pre-allocated buffers.

Example Implementation 22

The system of implementation 13, wherein the second stage input data comprises data output by the processing operation of the first stage processor.

Example Implementation 23

The system of implementation 13, wherein the first stage processor comprises a stage processor selected from a group consisting of a data batcher associated with the pipelined application, a pre-processor of the BPAS and a computational processor of the BPAS; and, wherein the first execution stage is selected from a group comprising a data batching stage, a pre-processing stage, and a computational processing stage.

Example Implementation 24

The system of implementation 13, wherein memories among the at least one physical memory of the BPAS are selected from a group comprising: a memory of a host system; a memory of a runtime processor; a memory of a reconfigurable dataflow unit; and, a memory communicatively coupled to hardware processors of the BPAS.

Example Implementation 25

The system of embodiment 13, wherein the PPI comprises an interface selected from a group comprising an ALLOCATE BUFFERS interface, a GET BUFFER PARMS interface, a LOAD interface, and a RUN interface; wherein the BPM configured to allocate the plurality of pipeline buffers comprises the BPM further configured to allocate the plurality of pipeline buffers responsive to the ALLOCATE BUFFERS interface; wherein the GET BUFFER PARMS interface of the PPI comprises at least one of a first and a second return argument, the first return argument specifying a buffer, among the plurality of pipeline buffers, for use by an execution stage processor among the plurality of stage processors, the second return argument comprising a parameter of a buffer among the plurality of pipeline buffers; wherein the BPM configured to determine the first buffer ready status comprises the BPM further configured to determine the first buffer ready status responsive to the LOAD interface; and, wherein the BPM configured to initiate the operations of the first stage processor comprises the BPM further configured to initiate the operations of the first stage processor responsive to the RUN interface.

Example Implementation 26

A computer program product comprises a computer readable storage medium having program instructions embodied therewith, wherein the program instructions are executable by at least one processor to cause the at least one processor to:

allocate, responsive to a first interface of a Pipeline Programming Interface (PPI) of a Buffer Pipelined Application computing System (BPAS), based on execution parameters associated with the BPAS executing a pipelined application, a plurality of pipeline buffers, the pipelined application comprising a plurality of application execution stages, the BPAS comprising a plurality of stage processors to execute corresponding execution stages among plurality of application execution stages, the plurality of pipeline buffers included in at least one physical memory of the BPAS; and, to configure access to a first buffer, among the plurality of pipeline buffers, by a first stage processor among the plurality of stage processors, the first buffer included in a first region of a first physical memory, the first physical memory among the at least one physical memory of the BPAS, the first stage processor to execute a first execution stage, among the plurality of application execution stages of the pipelined application, utilizing the first buffer.

The program instructions can further cause the at least one processor to initiate, responsive to the configuring the access to the first buffer by the first stage processor, operations of the first stage processor utilizing the first buffer; determine a first buffer ready status associated with a processing operation of the first stage processor on data included in the first buffer, the first data ready status corresponding to second stage input data ready for processing by a second stage processor, the second stage input data comprising data output by an operation of the first stage processor, the second stage processor to execute a second execution stage, among the plurality of application execution stages, to process the second stage input data; transfer, responsive to the first buffer ready status, the first buffer to the second stage processor for processing, by the second stage processor, the second stage input data; and, configure, responsive to the transferring the first buffer, access by the second stage processor to a second buffer among the plurality of pipeline buffers, the second buffer including the second stage input data, the second buffer included in a second region of a second physical memory, the second memory among the at least one physical memory of the BPAS.

Example Implementation 27

The computer program product of implementation 26, wherein the program instructions are executable by at least one processor to further cause the at least one processor to: determine that the first region of the first memory is different from the second region of the second memory; determine, based on the first region of the first memory different from the second region of the second memory, and based further on a memory access attribute of at least one of the first and second physical memories, to transfer the second stage input data from the first region of the first physical memory to the second region of a second physical memory of the BPAS; and, initiate, responsive to the determining to transfer the second stage input data from the first region of the first physical memory to the second region of the second physical memory, a transfer of the second stage input data from the first region of the first physical memory to the second region of the second physical memory.

Example Implementation 28

The computer program product of implementation 26, wherein the program instructions are executable by at least one processor to further cause the at least one processor to modify address translation logic of the BPAS to translate a virtual address of a buffer, among the plurality of pipeline buffers, to a physical address of a region of a physical memory among the at least one physical memory.

Example Implementation 29

The computer program product of implementation 26, wherein the program instructions are executable by at least one processor to further cause the at least one processor to process interfaces of the PPI selected from a group comprising an ALLOCATE BUFFERS interface, a GET BUFFER PARMS interface, a LOAD interface, and a RUN interface; wherein the program instructions are executable by at least one processor to further cause the at least one processor to allocate the plurality of pipeline buffers responsive to the ALLOCATE BUFFERS interface; wherein the of the PPI comprises first and wherein the program instructions are executable by at least one processor to further cause the at least one processor to output from the GET BUFFER PARMS interface at least one of a first return argument specifying a buffer, among the plurality of pipeline buffers, for use by an execution stage processor among the plurality of stage processors, and a second return argument comprising a parameter of a buffer among the plurality of pipeline buffers; wherein the program instructions are executable by at least one processor to further cause the at least one processor to determine the first buffer ready status responsive to the LOAD interface; and, wherein the program instructions are executable by at least one processor to further cause the at least one processor to initiate the operations of the first stage processor responsive to the RUN interface.

Example Implementation 30

The computer program product of implementation 26, wherein the program instructions are executable by at least one processor to further cause the at least one processor to allocate buffers, among the pipeline buffers, using pre-allocated buffers associated with the BPAS executing the pipelined application.

What is claimed is:

1. A method, the method comprising:
   allocating, by a computer-implemented Buffer-Pipeline Manager (BPM), responsive to a first interface of a Pipeline Programming Interface (PPI) of a Buffer Pipelined Application computing System (BPAS), based on execution parameters associated with the BPAS executing a pipelined application, a plurality of pipeline buffers, the BPM included in the BPAS, the pipelined application comprising a plurality of application execution stages, the BPAS comprising a plurality of stage processors to execute corresponding execution stages among plurality of application execution stages, the plurality of pipeline buffers included in at least one physical memory of the BPAS;

configuring, by the BPM, access to a first buffer, among the plurality of pipeline buffers, by a first stage processor among the plurality of stage processors, the first buffer included in a first region of a first physical memory, the first physical memory among the at least one physical memory of the BPAS, the first stage processor to execute a first execution stage, among the plurality of application execution stages of the pipelined application, utilizing the first buffer;

initiating, by the BPM, responsive to the configuring the access to the first buffer by the first stage processor, operations of the first stage processor utilizing the first buffer;

determining, by the BPM, a first buffer ready status associated with a processing operation of the first stage processor on data included in the first buffer, the first data ready status corresponding to second stage input data ready for processing by a second stage processor, the second stage input data comprising data output by an operation of the first stage processor, the second stage processor to execute a second execution stage, among the plurality of application execution stages, to process the second stage input data;

transferring, by the BPM in response to the first buffer ready status, the first buffer to the second stage processor for processing, by the second stage processor, the second stage input data; and, configuring, by the BPM, responsive to the transferring the first buffer, access by the second stage processor to a second buffer among the plurality of pipeline buffers, the second buffer including the second stage input data, the second buffer included in a second region of a second physical memory, the second memory among the at least one physical memory of the BPAS.

2. The method of claim 1, wherein the first region of the first memory is different from the second region of the second memory and wherein the method the BPM transferring the first buffer to the second stage processor comprises:

determining, by the BPM, based on the first region of the first memory different from the second region of the second memory, and based further on a memory access attribute of at least one of the first and second physical memories, to transfer the second stage input data from the first region of the first physical memory to the second region of a second physical memory of the BPAS; and, initiating, by the BPM, responsive to the determining to transfer the second stage input data from the first region of the first physical memory to the second region of the second physical memory, a transfer of the second stage input data from the first region of the first physical memory to the second region of the second physical memory.

3. The method of claim 2, wherein the method further comprises:

determining, by the BPM, responsive to the BPM initiating the transfer of the second stage input data, a completion status of the transfer; and, communicating, by the BPM, to the first stage processor, responsive to the determining the completion status of the transfer, that the first buffer is available for reuse by the first stage processor.

4. The method of claim 1, the method further comprising initiating, by the BPM, responsive to the configuring the access to the second buffer by the second stage processor, operations of the second stage processor on the second stage input data.

5. The method of claim 1, wherein at least one of the method the BPM configuring the access to the first buffer and the method the BPM configuring the access to the second buffer comprises the BPM modifying address translation logic of the BPAS to translate a virtual address (VA) of at least one of the first and second buffers to a physical address (PA) of the at least one of the first and the second buffers in the respective first and second physical memories.

6. The method of claim 1, wherein the method the BPM allocating the plurality of pipeline buffers comprises determining, by the BPM, based on execution parameters associated with executing the pipelined application, the first region of the first physical memory to include the first buffer and the second region of a second physical memory to include the second buffer.

7. The method of claim 1, wherein the method the BPM allocating the plurality of pipeline buffers comprises the BPM modifying address translation logic of the BPAS to translate a virtual address of a buffer, among the plurality of pipeline buffers, to a physical address of a region of a physical memory among the at least one physical memory.

8. The method of claim 1, wherein the method the BPM allocating the plurality of pipeline buffers comprises the BPM allocating buffers, among the pipeline buffers, using pre-allocated buffers associated with the BPAS executing the pipelined application.

9. The method of claim 8, wherein the method the BPM determining the first region of the first physical memory to include the first buffer and the method the BPM determining the second region of the second physical memory to include the second buffer comprises the BPM determining the first region and the second region based on the pre-allocated buffers.

10. The method of claim 1, wherein the second stage input data comprises data output by the processing operation of the first stage processor.

11. The method of claim 1, wherein the first stage processor comprises a stage processor selected from a group consisting of a data batcher associated with the pipelined application, a pre-processor of the BPAS and a computational processor of the BPAS; and, wherein the first execution stage is selected from a group comprising a data batching stage, a pre-processing stage, and a computational processing stage.

12. The method of claim 1, wherein the PPI comprises an interface selected from a group comprising an ALLOCATE BUFFERS interface, a GET BUFFER PARMS interface, a LOAD interface, and a RUN interface;

wherein the method the BPM allocating the plurality of pipeline buffers comprises the BPM allocating the plurality of pipeline buffers responsive to the ALLOCATE BUFFERS interface;

wherein the GET BUFFER PARMS interface of the PPI comprises at least one of a first and a second return argument, the first return argument specifying a buffer, among the plurality of pipeline buffers, for use by an execution stage processor among the plurality of stage processors, the second return argument comprising a parameter of a buffer among the plurality of pipeline buffers;

wherein the method the BPM determining the first buffer ready status comprises the BPM determining the first buffer ready status responsive to the LOAD interface; and, wherein the method the BPM initiating the operations of the first stage processor comprises the BPM initiating the operations of the first stage processor responsive to the RUN interface.

13. A Buffer Pipelined Application computing System (BPAS), the BPAS comprising:
   at least one hardware processor;
   at least one physical memory;
   a first stage processor configured to execute, utilizing a first hardware processor among the at least one hardware processor, a first execution stage among a plurality of application execution stages of a pipelined application;
   a second stage processor configured to execute, utilizing a second hardware processor among the at least one hardware processor, a second execution stage among the plurality of application execution stages;
   an application execution program (AEP) configured to execute, utilizing a third processor among the at least one hardware processor, operations to manage execution of the pipelined application by the system;
   a Pipeline Programming Interface (PPI); and,
   a Buffer-Pipeline Manager (BPM), the BPM configured to:
   allocate, responsive to a first interface of the PPI, based on execution parameters associated with the system executing the pipelined application, a plurality of pipeline buffers, the plurality of pipeline buffers included in memories among the at least one physical memory;
   configure access to a first buffer, among the plurality of pipeline buffers, by the first stage processor, the first buffer included in a first region of a first physical memory, the first physical memory among the at least one physical memory of the BPAS, the first stage processor further configured to execute the first execution stage utilizing the first buffer;
   initiate, responsive to the configuring the access to the first buffer by the first stage processor, operations of the first stage processor utilizing the first buffer;
   determine a first buffer ready status associated with a processing operation of the first stage processor on data included in the first buffer, the first data ready status corresponding to second stage input data ready for processing by the second stage processor, the second stage input data comprising data output by an operation of the first stage processor, the second stage processor further configured to execute the second execution stage to process the second stage input data;
   transfer, in response to the first buffer ready status, the first buffer to the second stage processor for processing, by the second stage processor, the second stage input data; and,
   configure, responsive to the transferring the first buffer, access by the second stage processor to a second buffer among the plurality of pipeline buffers, the second buffer including the second stage input data, the second buffer included in a second region of a second physical memory, the second memory among the at least one physical memory of the BPAS.

14. The BPAS of claim 13, wherein the first region of the first memory is different than the second region of the second memory; and,
   wherein the BPM configured to transfer the first buffer to the second stage processor comprises the BPM further configured to:
   determine, based on the first region of the first memory different from the second region of the second memory, and based further on based on a memory access attribute of at least one of the first and second physical memories, to transfer the second stage input data from the first region of the first physical memory to the second region of a second physical memory of the BPAS, the memory access attribute selected from a group consisting of: a distance of a first hardware processor to the memory, a bandwidth of the memory, an access latency of the memory, and access to the memory by the first hardware processor; and,
   initiate, responsive to the determining to transfer the second stage input data from the first region of the first physical memory to the second region of the second physical memory, a transfer of the second stage input data from the first region of the first physical memory to the second region of the second physical memory a transfer of the second stage input data from the first region of the first physical memory to the second region of the second physical memory.

15. The BPAS of claim 14, wherein the BPM is further configured to:
   determine, responsive to the BPM initiating the transfer of the second stage input data, a completion status of the transfer; and,
   communicate, to the first stage processor, responsive to the determining the completion status of the transfer, that the first buffer is available for reuse by the first stage processor.

16. The BPAS of claim 13, wherein the BPM is further configured to initiate, responsive to the BPM configuring the access to the second buffer by the second stage processor, operations of the second stage processor on the second stage input data.

17. The BPAS of claim 13, wherein the system further comprises address translation logic; and,
   wherein at least one of the BPM configured to configure the access to the first buffer and the BPM configured to configure the access to the second buffer comprises the BPM further configured to modify the address translation logic to translate a virtual address of at least one of the first and second buffers to a corresponding physical address of the at least one of the first and second buffers in the at least one physical memory.

18. The BPAS of claim 13, wherein the BPM configured to allocate the plurality of pipeline buffers comprises the BPM further configured to determine the first region of the first physical memory to include the first buffer and the second region of a second physical memory to include the second buffer based on execution parameters associated with the system executing the pipelined application.

19. The BPAS of claim 13, wherein the system further comprises address translation logic; and,
   wherein the BPM configured to allocate the plurality of pipeline buffers comprises the BPM further configured to modify the address translation logic to translate a virtual address of a buffer, among the plurality of pipeline buffers, to a physical address of a region of a physical memory among the at least one physical memory.

20. The BPAS of claim 13, wherein the BPM configured to allocate the plurality of pipeline buffers comprises the BPM further configured to allocate buffers, among the pipeline buffers, using pre-allocated buffers associated with the system executing the pipelined application.

21. The BPAS of claim 20, wherein the BPM configured to determine the first region of the first physical memory to include the first buffer and the BPM configured to determine the second region of the second physical memory to include the second buffer comprises the BPM further configured to determine the first region and the second region based on the pre-allocated buffers.

22. The BPAS of claim 13, wherein the second stage input data comprises data output by the processing operation of the first stage processor.

23. The BPAS of claim 13, wherein the first stage processor comprises a stage processor selected from a group consisting of a data batcher associated with the pipelined application, a pre-processor of the BPAS and a computational processor of the BPAS; and,
wherein the first execution stage is selected from a group comprising a data batching stage, a pre-processing stage, and a computational processing stage.

24. The BPAS of claim 13, wherein memories among the at least one physical memory of the BPAS are selected from a group comprising: a memory of a host system; a memory of a runtime processor; a memory of a reconfigurable dataflow unit; and, a memory communicatively coupled to hardware processors of the BPAS.

25. The BPAS of claim 13, wherein the PPI comprises an interface selected from a group comprising an ALLOCATE BUFFERS interface, a GET BUFFER PARMS interface, a LOAD interface, and a RUN interface;
wherein the BPM configured to allocate the plurality of pipeline buffers comprises the BPM further configured to allocate the plurality of pipeline buffers responsive to the ALLOCATE BUFFERS interface;
wherein the GET BUFFER PARMS interface of the PPI comprises at least one of a first and a second return argument, the first return argument specifying a buffer, among the plurality of pipeline buffers, for use by an execution stage processor among the plurality of stage processors, the second return argument comprising a parameter of a buffer among the plurality of pipeline buffers;
wherein the BPM configured to determine the first buffer ready status comprises the BPM further configured to determine the first buffer ready status responsive to the LOAD interface; and,
wherein the BPM configured to initiate the operations of the first stage processor comprises the BPM further configured to initiate the operations of the first stage processor responsive to the RUN interface.

26. A computer program product, the computer program product comprising a computer readable storage medium having program instructions embodied therewith, wherein the program instructions are executable by at least one processor to cause the at least one processor to:
allocate, responsive to a first interface of a Pipeline Programming Interface (PPI) of a Buffer Pipelined Application computing System (BPAS), based on execution parameters associated with the BPAS executing a pipelined application, a plurality of pipeline buffers, the pipelined application comprising a plurality of application execution stages, the BPAS comprising a plurality of stage processors to execute corresponding execution stages among plurality of application execution stages, the plurality of pipeline buffers included in at least one physical memory of the BPAS;
configure access to a first buffer, among the plurality of pipeline buffers, by a first stage processor among the plurality of stage processors, the first buffer included in a first region of a first physical memory, the first physical memory among the at least one physical memory of the BPAS, the first stage processor to execute a first execution stage, among the plurality of application execution stages of the pipelined application, utilizing the first buffer;
initiate, responsive to the configuring the access to the first buffer by the first stage processor, operations of the first stage processor utilizing the first buffer;
determine a first buffer ready status associated with a processing operation of the first stage processor on data included in the first buffer, the first data ready status corresponding to second stage input data ready for processing by a second stage processor, the second stage input data comprising data output by an operation of the first stage processor, the second stage processor to execute a second execution stage, among the plurality of application execution stages, to process the second stage input data;
transfer, responsive to the first buffer ready status, the first buffer to the second stage processor for processing, by the second stage processor, the second stage input data; and,
configure, responsive to the transferring the first buffer, access by the second stage processor to a second buffer among the plurality of pipeline buffers, the second buffer including the second stage input data, the second buffer included in a second region of a second physical memory, the second memory among the at least one physical memory of the BPAS.

27. The computer program product of claim 26, wherein the program instructions are executable by at least one processor to further cause the at least one processor to:
determine that the first region of the first memory is different from the second region of the second memory;
determine, based on the first region of the first memory different from the second region of the second memory, and based further on a memory access attribute of at least one of the first and second physical memories, to transfer the second stage input data from the first region of the first physical memory to the second region of a second physical memory of the BPAS; and,
initiate, responsive to the determining to transfer the second stage input data from the first region of the first physical memory to the second region of the second physical memory, a transfer of the second stage input data from the first region of the first physical memory to the second region of the second physical memory.

28. The computer program product of claim 26, wherein the program instructions are executable by at least one processor to further cause the at least one processor to modify address translation logic of the BPAS to translate a virtual address of a buffer, among the plurality of pipeline buffers, to a physical address of a region of a physical memory among the at least one physical memory.

29. The computer program product of claim 26, wherein the program instructions are executable by at least one processor to further cause the at least one processor to process interfaces of the PPI selected from a group comprising an ALLOCATE BUFFERS interface, a GET BUFFER PARMS interface, a LOAD interface, and a RUN interface;
- wherein the program instructions are executable by at least one processor to further cause the at least one processor to allocate the plurality of pipeline buffers responsive to the ALLOCATE BUFFERS interface;
- wherein the of the PPI comprises first and wherein the program instructions are executable by at least one processor to further cause the at least one processor to output from the GET BUFFER PARMS interface at least one of a first return argument specifying a buffer, among the plurality of pipeline buffers, for use by an execution stage processor among the plurality of stage processors, and a second return argument comprising a parameter of a buffer among the plurality of pipeline buffers;
- wherein the program instructions are executable by at least one processor to further cause the at least one processor to determine the first buffer ready status responsive to the LOAD interface; and,
- wherein the program instructions are executable by at least one processor to further cause the at least one processor to initiate the operations of the first stage processor responsive to the RUN interface.

30. The computer program product of claim 26, wherein the program instructions are executable by at least one processor to further cause the at least one processor to allocate buffers, among the pipeline buffers, using pre-allocated buffers associated with the BPAS executing the pipelined application.

* * * * *